(12) United States Patent
Kim et al.

(10) Patent No.: US 11,983,353 B2
(45) Date of Patent: *May 14, 2024

(54) TOUCH APPARATUS AND TOUCH DETECTION METHOD THEREOF

(71) Applicant: HiDeep Inc., Seongnam-si (KR)

(72) Inventors: Seyeob Kim, Seongnam-si (KR);
Bonkee Kim, Seongnam-si (KR);
Youngho Cho, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/584,561

(22) Filed: Jan. 26, 2022

(65) Prior Publication Data
US 2022/0147177 A1 May 12, 2022

Related U.S. Application Data

(63) Continuation of application No. 16/898,651, filed on Jun. 11, 2020, now Pat. No. 11,269,441.

(30) Foreign Application Priority Data

Jun. 12, 2019 (KR) .................. 10-2019-0069472

(51) Int. Cl.
*G06F 3/041* (2006.01)
(52) U.S. Cl.
CPC ................... *G06F 3/0416* (2013.01)
(58) Field of Classification Search
CPC . G06F 3/0416; G06F 3/04166; G06F 3/03545
See application file for complete search history.

(56) References Cited

U.S. PATENT DOCUMENTS

| | | | |
|---|---|---|---|
| 9,158,418 B2* | 10/2015 | Oda | G06F 3/0445 |
| 9,928,700 B1* | 3/2018 | Levesque | G06F 3/016 |
| 10,474,280 B2* | 11/2019 | Jang | G06F 3/03545 |
| 10,698,524 B2 | 6/2020 | Park et al. | |
| 2006/0033585 A1* | 2/2006 | Greywall | G01R 33/0283 331/65 |
| 2009/0015098 A1* | 1/2009 | Matsuo | H10N 30/2023 310/317 |
| 2009/0051491 A1* | 2/2009 | Lu | H04B 5/0087 340/10.1 |
| 2012/0062497 A1* | 3/2012 | Rebeschi | G06F 3/0445 345/174 |
| 2012/0062498 A1* | 3/2012 | Weaver | G06F 3/0442 345/174 |
| 2012/0062499 A1* | 3/2012 | Weaver | G06F 3/0446 345/174 |

(Continued)

FOREIGN PATENT DOCUMENTS

CN 108885517 11/2018

*Primary Examiner* — Amy Onyekaba
(74) *Attorney, Agent, or Firm* — LEX IP MEISTER, PLLC

(57) ABSTRACT a touch device according to an exemplary embodiment includes: a plurality of touch electrodes; and a driver/receiver that applies driving signals, each having a frequency corresponding to a resonance frequency of a stylus pen, to the plurality of touch electrodes, and receives detection signals from the plurality of touch electrodes, wherein the driving signals may include a first driving signal and a second driving signal, each having a different phase.

20 Claims, 19 Drawing Sheets

(56) References Cited

U.S. PATENT DOCUMENTS

| | | | |
|---|---|---|---|
| 2012/0068964 A1* | 3/2012 | Wright | G06F 3/0442 345/174 |
| 2012/0105362 A1* | 5/2012 | Kremin | G06F 3/0446 345/174 |
| 2012/0182254 A1* | 7/2012 | Jang | G06F 3/0442 345/174 |
| 2013/0127773 A1* | 5/2013 | Kwon | G06F 3/04166 345/174 |
| 2013/0160546 A1* | 6/2013 | Kim | G01C 19/56 73/504.12 |
| 2013/0300712 A1* | 11/2013 | Kim | G06F 3/0446 345/174 |
| 2014/0078101 A1* | 3/2014 | Katsurahira | G06F 3/0442 345/174 |
| 2014/0092044 A1* | 4/2014 | Kim | G06F 15/0291 345/173 |
| 2014/0104224 A1* | 4/2014 | Ih | G06F 3/0446 345/174 |
| 2014/0132529 A1* | 5/2014 | Jeong | G06F 3/0442 345/173 |
| 2014/0152621 A1* | 6/2014 | Okayama | G06F 3/04182 345/174 |
| 2014/0152623 A1* | 6/2014 | Lee | G06F 3/03545 345/175 |
| 2014/0157119 A1* | 6/2014 | Lim | G06F 40/169 715/256 |
| 2014/0232691 A1* | 8/2014 | Lee | G06F 3/0443 345/174 |
| 2014/0362007 A1* | 12/2014 | Jung | H04N 23/45 345/173 |
| 2015/0049049 A1* | 2/2015 | Kim | G06F 3/044 345/174 |
| 2015/0091856 A1* | 4/2015 | Park | G06F 3/0446 345/174 |
| 2015/0103039 A1* | 4/2015 | Cho | G06F 3/03545 345/174 |
| 2015/0242043 A1* | 8/2015 | Oda | G06F 3/0446 345/174 |
| 2015/0338968 A1* | 11/2015 | Yao | G06F 3/0383 345/174 |
| 2016/0026271 A1* | 1/2016 | Yao | G06F 3/04162 345/173 |
| 2016/0062519 A1* | 3/2016 | Park | G06F 3/0446 345/173 |
| 2016/0099983 A1* | 4/2016 | Han | G06F 3/046 715/752 |
| 2016/0209957 A1* | 7/2016 | Jung | G06F 3/017 |
| 2016/0216784 A1* | 7/2016 | Kim | G06F 3/0441 |
| 2016/0224174 A1* | 8/2016 | Hashimoto | G06F 3/03545 |
| 2016/0239123 A1* | 8/2016 | Ye | G06F 3/04166 |
| 2016/0306465 A1* | 10/2016 | Ahn | G06F 3/04166 |
| 2017/0060278 A1* | 3/2017 | Jung | G06F 3/03545 |
| 2017/0090658 A1* | 3/2017 | Park | G06F 3/04166 |
| 2017/0131798 A1* | 5/2017 | Geaghan | G06F 3/0441 |
| 2017/0153763 A1* | 6/2017 | Vavra | G06F 3/0442 |
| 2017/0192534 A1* | 7/2017 | Han | G06F 3/03545 |
| 2017/0192591 A1* | 7/2017 | Jang | G06F 3/04166 |
| 2017/0212635 A1* | 7/2017 | Cordeiro | G06F 3/04182 |
| 2017/0277284 A1* | 9/2017 | Kim | G06F 3/03545 |
| 2017/0285771 A1* | 10/2017 | Jung | G06F 3/0383 |
| 2017/0293395 A1* | 10/2017 | Kim | G06F 3/0446 |
| 2017/0308223 A1 | 10/2017 | Park et al. | |
| 2017/0344173 A1* | 11/2017 | Tang | G06F 3/0447 |
| 2018/0004345 A1* | 1/2018 | Shin | G06F 3/0412 |
| 2018/0113549 A1* | 4/2018 | Park | G06F 3/04162 |
| 2018/0150177 A1* | 5/2018 | Hwang | G06F 3/044 |
| 2018/0181229 A1* | 6/2018 | Kwon | G09G 3/20 |
| 2018/0217686 A1* | 8/2018 | Qiao | G06F 3/0442 |
| 2019/0004649 A1* | 1/2019 | Ju | G06F 3/0446 |
| 2019/0384452 A1* | 12/2019 | Kang | G06F 3/0412 |
| 2020/0026383 A1* | 1/2020 | Hwang | G06F 3/0446 |
| 2020/0042118 A1* | 2/2020 | Mugiraneza | G06F 3/0446 |
| 2020/0097118 A1* | 3/2020 | Kang | G06F 3/03545 |
| 2021/0168264 A1* | 6/2021 | Matsuda | H04N 23/56 |

\* cited by examiner

TOUCH APPARATUS AND TOUCH DETECTION METHOD THEREOF

CROSS-REFERENCE TO RELATED APPLICATION

This application is a Continuation Application of U.S. patent application Ser. No. 16/898,651, which was filed on Jun. 11, 2020, which claims priority to and the benefit of Korean Patent Application No. 10-2019-0069472 filed in the Korean Intellectual Property Office on Jun. 12, 2019, the entire contents of which are incorporated herein by reference.

BACKGROUND

(a) Field

The present disclosure relates to a touch apparatus and a touch detection method thereof.

(b) Description of the Related Art

Various terminals such as mobile phones, smart phones, tablet PCs, laptop computers, terminals for digital broadcasting, personal digital assistants (PDAs), portable multimedia players (PMPs), and navigation devices are provided with a touch sensor.

Within these terminals, the touch sensor can be positioned on a display panel that displays an image, or it can be positioned on an area of the terminal body. Since a user interacts with the terminal by touching the touch sensor, the terminal can provide an intuitive user interface to the user.

The user can use a stylus pen for a sophisticated touch input. The stylus pen can transmit/receive signals through a touch sensor and an electrical and/or magnetic method. In case of a passive type of stylus pen, the stylus pen generates a signal by resonating with a driving signal applied to a touch sensor, and the touch sensor detects a touch position by receiving a resonance signal of the stylus pen.

There is noise due to various reasons in the touch apparatus, and the noise may act as a factor that degrades the detection performance of the touch apparatus. In particular, in the case of a stylus pen, when noise of a frequency bandwidth similar to a resonance frequency of the stylus pen exists, the precision of touch detection may be greatly reduced.

The above information disclosed in this Background section is only for enhancement of understanding of the background of the invention, and therefore it may contain information that does not form the prior art that is already known in this country to a person of ordinary skill in the art.

SUMMARY

Exemplary embodiments provide a touch device that can improve touch detection performance by a stylus pen in an environment where noise exists in a frequency bandwidth that is similar to that of a resonance of the stylus pen, and a touch detection method thereof.

In order to achieve the above-stated or other purpose, a touch device according to an exemplary embodiment includes: a plurality of touch electrodes; and a driver/receiver that applies driving signals, each having a frequency corresponding to a resonance frequency of a stylus pen, to the plurality of touch electrodes, and receives detection signals from the plurality of touch electrodes, wherein the driving signals may include a first driving signal and a second driving signal, each having a different phase.

The touch device may further include a controller that acquires first touch data based on detection signals received from the plurality of touch electrodes during a first section, the driver/receiver may apply the first driving signal to the plurality of touch electrodes during a second section and applies the second driving signal to the plurality of touch electrodes during a third section, and the first section may include at least one of the second sections and at least one of the third sections.

The controller may further acquire second touch data based on detection signals received from the plurality of touch electrodes in at least one of the second section and the third section.

The number of second sections and the number of third sections included in the first section may be the same.

The number of second sections and the number of third sections included in the first section may be different from each other.

The second section and the third section may be alternately arranged with a predetermined period in the first section.

The second section and the third section may repeat at least once in the first section.

Each of the second section and the third section may be continuously arranged at least two times in the first section.

The number of consecutive times of the second section and the number of consecutive times of the third section in the first section may be different from each other.

The number of consecutive times of the second section and the number of consecutive times of the third section in the first section may be the same.

The controller may calculate a first amplitude value by multiplying a first value by an amplitude value of a first detection signal when detection signals are the first detection signals received from the plurality of touch electrodes corresponding to the first driving signal, calculate a second amplitude value by multiplying a second value by an amplitude value of a second detection signal when the detection signals are the second detection signals received from the plurality of touch electrodes corresponding to the second driving signal, and acquire the first touch data based on the first amplitude value and the second amplitude value, and the first value and the second value may have the same absolute value and different signs.

The first touch data or the second touch data may correspond to a capacitance change amount of the touch electrode, a change amount of the detection signal, or an analog-to-digital converter output due to a touch of the stylus pen.

A touch detection method of a touch device according to an exemplary embodiment includes: selectively applying one of a first driving signal and a second driving signal, each having a frequency corresponding to a resonance frequency of a stylus pen and a different phase, to a plurality of touch electrodes; receiving detection signals from the plurality of touch electrodes; calculating amplitude of each of the detection signals; repeating the applying, the receiving, and the calculating a predetermined number of times; acquiring a final signal amplitude corresponding to each of the plurality of touch electrodes by using the amplitude calculated whenever the calculating is performed; and acquiring touch data by touch of the stylus pen based on the final signal amplitude.

The selective applying may include selectively applying one of the first driving signal and the second driving signal such that the number of times the first driving signal is applied and the number of times the second driving signal is applied may be the same within the predetermined number of times.

The selective applying may include selectively applying one of the first driving signal and the second driving signal such that the number of times the first driving signal is applied and the number of times the second driving signal is applied may be different from each other within the predetermined number of times.

The selective applying may include selectively applying one of the first driving signal and the second driving signal such that the first driving signal and the second driving signal may be alternately applied at a predetermined cycle within the predetermined number of times.

The selective applying may include selectively applying one of the first driving signal and the second driving signal such that application of the first driving signal and application of the second driving signal repeat at least once within the predetermined number of times.

The selective applying may include selectively applying one of the first driving signal and the second driving signal such that each of the first driving signal and the second driving signal may be continuously applied at least two times, and, the number of times the first driving signal is continuously applied and the number of times the second driving signal is continuously applied may be different from each other within the predetermined number of times.

The selective applying may include selectively applying one of the first driving signal and the second driving signal such that each of the first driving signal and the second driving signal may be continuously applied at least two times, and the number of times the first driving signal is continuously applied and the number of times the second driving signal is continuously applied may be the same within the predetermined number of times.

T calculating a first amplitude value by multiplying a first value by an amplitude value of a first detection signal when the detection signals received from the plurality of touch electrodes corresponding to the first driving signal are the first detection signals; calculating a second amplitude value by multiplying a second value by an amplitude value of a second detection signal when the detection signals received from the plurality of touch electrodes corresponding to the second driving signal are the second detection signals; and acquiring the final signal amplitude based on the first amplitude value and the second amplitude value acquired during a predetermined time period, wherein the first value and the second value may have the same absolute value and different signs.

The acquiring of the touch data may include acquiring the touch data based on a touch electrode of which corresponding final signal intensity is a threshold value or higher among the plurality of touch electrodes.

According to the exemplary embodiments, touch detection performance by a stylus pen can be improved in an environment where noise exists in a frequency bandwidth that is similar to that of a resonance of the stylus pen.

DETAILED DESCRIPTION OF THE EMBODIMENTS

Figure 1:
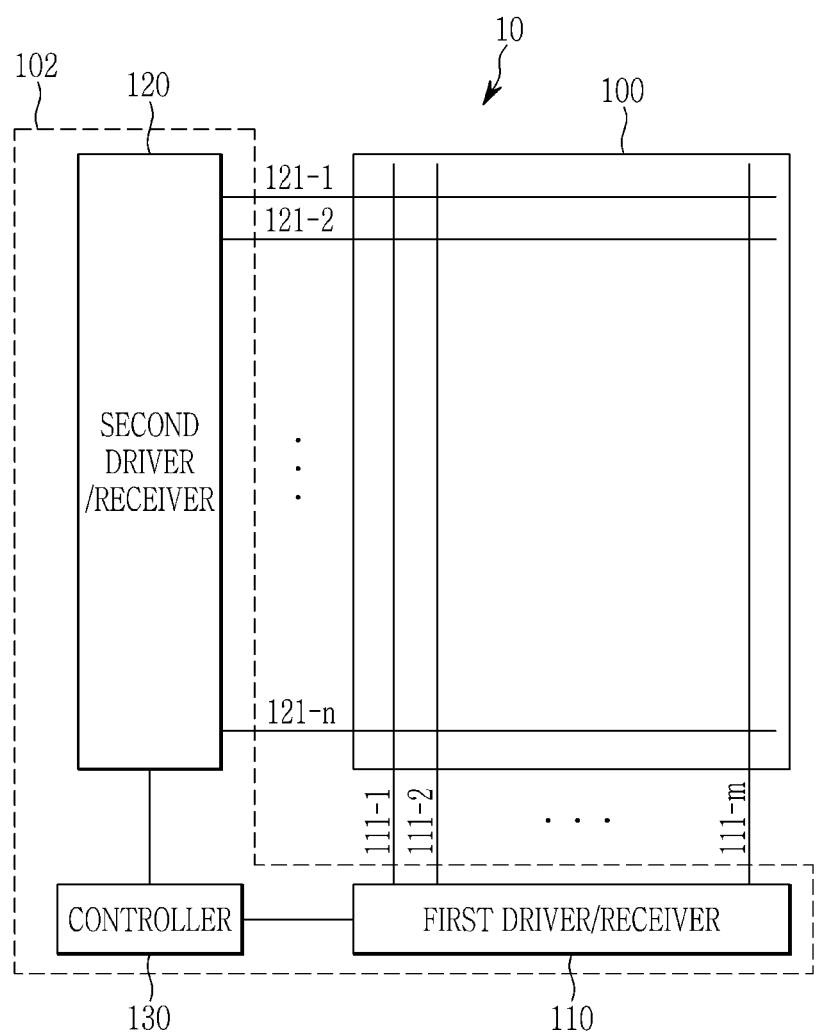
FIG. 1 schematically shows a touch apparatus according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification.

In this document, terms including ordinal numbers such as "first", "second", and "third" can be used to describe various configurations, but the constituent elements are not limited by the terms. The terms are only used to distinguish one constituent element from another constituent element. For example, a second constituent element may be referred to as a first constituent element without departing from the right range of the present invention, and similarly, a first constituent element may also be referred to as a second constituent element.

Because the size and thickness of each configuration shown in the drawings are arbitrarily shown for better understanding and ease of description, the present invention is not limited thereto, and the thicknesses of portions and regions are exaggerated for clarity. In the drawings, the thickness of layers, films, panels, regions, etc., are exaggerated for clarity. In addition, in the drawings, the thickness of some layers and regions is exaggerated for better understanding and ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising" will be understood to imply the inclusion of stated elements but not the exclusion of any other elements.

Hereinafter, a touch apparatus according to exemplary embodiments and a touch detection method thereof will be described with reference to necessary drawings.

Figure 2:
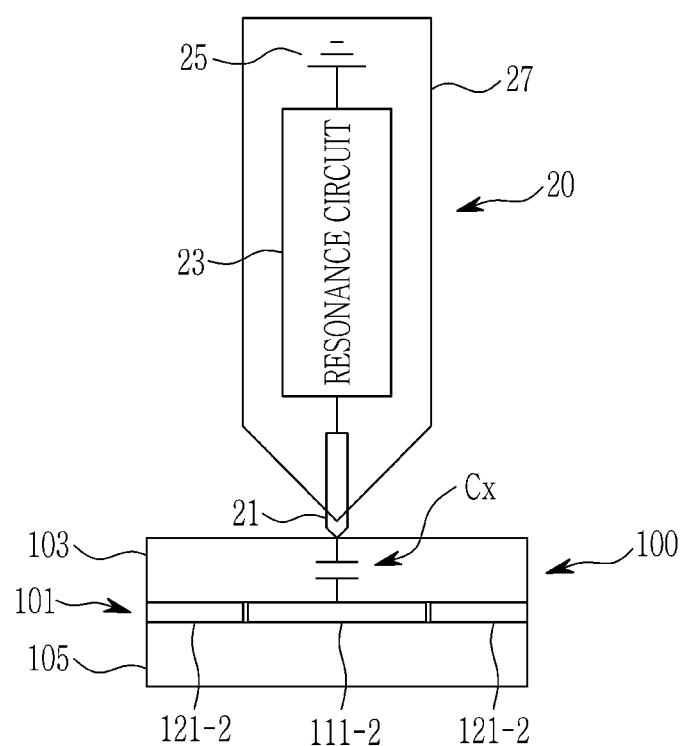
FIG. 2 shows an example that a stylus pen touches the touch apparatus according to the exemplary embodiment.

FIG. 1 schematically shows a touch apparatus according to an exemplary embodiment, and FIG. 2 shows an example that a stylus pen touches the touch apparatus according to the exemplary embodiment.

Referring to FIG. 1, a touch device 10 according to an exemplary embodiment includes a touch sensor 100 and a touch controller 102 that controls the touch sensor 100. The touch controller 102 may include a first driver/receiver 110 and a second driver/receiver 120 that transmit/receive signals to/from the touch sensor 100, and a controller 130.

The touch sensor 100 may include a plurality of touch electrodes 111-1 to 111-$m$ and 121-1 to 121-$n$.

Referring to FIG. 1, for example, the touch sensor 100 may include a plurality of first touch electrodes 111-1 to 111-$m$ extending in a first direction, and a plurality of second touch electrodes 121-1 to 121-$n$ extending in a second direction that crosses the first direction. In addition, in the touch sensor 100, the plurality of first touch electrodes 111-1 to 111-$m$ may be arranged in the second direction and the plurality of second touch electrodes 121-1 to 121-$n$ may be arranged in the first direction. In FIG. 1, the touch sensor 100 is formed in the shape of a quadrangle, but the shape of the touch sensor 100 is not limited thereto. For example, the touch sensor 100 may be formed in the shape of a circle, an oval, and the like.

Referring to FIG. 2, the touch sensor 100 further includes a substrate 105, and the plurality of touch electrodes 111-1 to 111-$m$ and 121-1 to 121- may be positioned on the substrate 105. In addition, the touch sensor 100 further includes a window 103, and the window 103 may be positioned on the plurality of touch electrodes 111-1 to 111-$m$ and 121-1 to 121-$n$. In FIG. 2, it is illustrated that the plurality of first touch electrodes 111-1 to 111-$m$ and the plurality of second touch electrodes 121-1 to 121-$n$ are positioned on the same layer, but this is not restrictive. The plurality of first touch electrodes 111-1 to 111-$m$ and the plurality of second touch electrodes 121-1 to 121-$n$ may be positioned on different layers.

Meanwhile, when the touch device 10 includes a display panel (not shown), the touch sensor 100 may be configured as an on-cell type touch sensor in which at least one touch electrode is directly formed on one surface of the display panel, for example, one surface of a thin film encapsulation layer of a organic light emitting display panel. Also, the touch sensor 100 may be configured as an in-cell type touch sensor in which at least one touch electrode is directly formed in the display panel.

The plurality of touch electrodes 111-1 to 111-$m$ and 121-1 to 121-$n$ may be connected to the driver/receivers 110 and 120 respectively through corresponding touch channels. For example, in FIG. 1, the plurality of first touch electrodes 111-1 to 111-$m$ are connected to the first driver/receiver 110, and the plurality of second touch electrodes 121-1 to 121-$n$ are connected to the second driver/receiver 120. Although it is illustrated in FIG. 1 that the first driver/receiver 110 and the second driver/receiver 120 are separated, the first driver/receiver 110 and the second driver/receiver 120 may be implemented as one module, unit, or chip.

The first driver/receiver 110 may apply a driving signal to the plurality of first touch electrodes 111-1 to 111-$m$ through a plurality of touch channels. In addition, the first driver/receiver 110 may receive detection signals from the plurality of first touch electrodes 111-1 to 111-$m$ through the plurality of touch channels. Likewise, the second driver/receiver 120 may apply a driving signal to the plurality of second touch electrodes 121-1 to 121-$n$ through the plurality of touch channels. In addition, the second driver/receiver 120 may receive detection signals from the plurality of first touch electrodes 121-1 to 121-$n$ through the plurality of touch channels. That is, the first driver/receiver 110 and the second driver/receiver 120 may be transceivers that transmit/receive signals.

When the driving signal is applied to the plurality of first touch electrodes 111-1 to 111-$m$ from the first driver/receiver 110, the touch channels corresponding to the plurality of first touch electrodes 111-1 to 111-$m$ function as driving channels. In addition, when the detection signals are transmitted to the first driver/receiver 110 from the plurality of first touch electrodes 111-1 to 111-$m$, the touch channels corresponding to the plurality of first touch electrodes 111-1 to 111-$m$ function as sense channels. Likewise, when the driving signal is applied to the plurality of second touch electrodes 121-1 to 121-$n$ from the second driver/receiver 110, the touch channels corresponding to the plurality of second touch electrodes 121-1 to 121-$n$ function as driving channels. In addition, when the detection signals area transmitted to the second driver/receiver 120 from the plurality of second touch electrodes 121-1 to 121-$n$, the touch channels corresponding to the plurality of second touch electrodes 121-1 to 121-$n$ function as touch channels.

The touch device 10 may be used to detect a touch input (direct touch or indirect touch) by a touch object. For example, the touch device 10 may be used to detect a touch input of a stylus pen 20 as shown in FIG. 2.

Referring to FIG. 2, stylus pen 20 may include a conductive tip 21, a resonance circuit 23, a ground 25, and a body 27.

The conductive tip 21 may be at least partially formed of a conductive material (e.g., a metal, conductive rubber, fabric, conductive silicon, and the like), and may be electrically connected to the resonance circuit 23.

The resonance circuit 23 is an LC resonance circuit, and may resonate with a driving signal applied to all electrodes of at least one type of the plurality of first touch electrodes 111-1 to 111-$m$ and the plurality of second touch electrodes 121-1 to 121-$n$ from at least one of the first driver/receiver 110 and the second driver/receiver 120 through the conductive tip 21. For this, the driving signal applied to the touch electrodes 111-1 to 111- and 121-1 to 121-$n$ may include a signal (e.g., a sine wave, a square wave, and the like) having a frequency that corresponds to a resonance frequency of the stylus pen 20. The resonance frequency of the stylus pen 20 depends on a designed value of the resonance circuit portion 23 of the stylus pen 20.

A resonance signal generated from the resonance circuit 23 resonated with the driving signal applied to the touch electrodes 111-1 to 111-*m* and 121-1 to 121-*n* is output to the touch sensor 100 through the conductive tip 21. The resonance signal due to resonance of the resonance circuit 12 may be transmitted to the conductive time in a section during which the driving signal that generates resonance of the resonance circuit 23 is applied to the touch electrodes 111-1 to 111-*m* and 121-1 to 121-*n* and a section thereafter. The resonance circuit 23 is disposed in the body 27, and may be electrically connected to the ground 25.

Such a stylus pen 20 generates a resonance signal in response to the driving signal applied to at least one of the touch electrodes 111-1 to 111-*m* and 121-1 to 121-*n* such that a touch input can be generated.

When the touch sensor 100 is touched by the stylus pen 20, capacitance Cx is formed by at least one of the touch electrodes 111-1 to 111-*m* and 121-1 to 121-*n*, and the conductive tip 21 of the stylus pen 20. The driving signal applied to the touch sensor 100 may be transmitted to the stylus pen 20 and the resonance signal may be transmitted to the touch sensor 100 through the capacitance Cx formed between at least one of the touch electrodes 111-1 to 111-*m* and 121-1 to 121-*n*, and the conductive tip 21.

The touch apparatus 10 may detect a touch made by a touch object (e.g., a user's body part (finger, palm, etc.) or a passive or active type of stylus pen) in addition to the stylus pen 20 of the above-described type, which generates the resonance signal.

For example, the touch apparatus 10 may detect a touch made by a stylus pen that receives an electrical signal and outputs an electrical signal as a magnetic field signal. Alternatively, the touch device 10 may detect a touch made by a stylus pen that receives a magnetic field signal and outputs the received signal as a resonated magnetic field signal.

The touch apparatus 10 may further include a digitizer. A magnetic field signal, which is electromagnetically resonated (or electromagnetically induced) by a stylus pen, is detected by the digitizer, whereby a touch can be detected.

The touch apparatus 10 may further include a coil that applies a current as a driving signal, in addition to the digitizer. In this case, the stylus pen resonates (or is electromagnetically induced) to the magnetic field signal generated from the coil to which the current is applied to generate a magnetic field signal, and the digitizer detects the magnetic field signal generated by the stylus pen through electromagnetic resonating (or electromagnetic inducing) such that a touch can be detected.

The controller 130 controls driving of the touch device 10, and may output touch data that includes touch coordinates correspond to a touch detection result of the touch device 10.

Next, referring to FIG. 3 and FIG. 4, a touch detection method according to an exemplary embodiment will be described.

Figure 3:
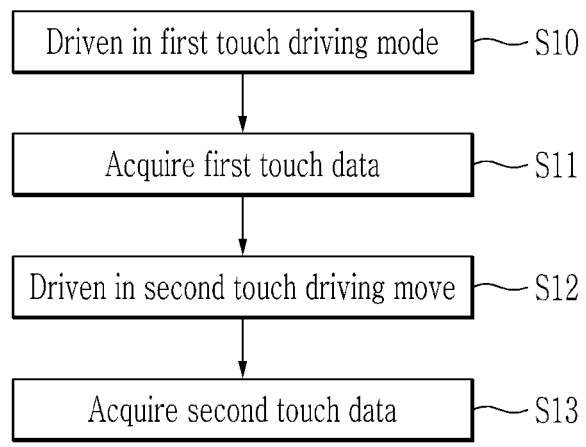
FIG. 3 is a flowchart of a touch detection method according to an exemplary embodiment within one frame section.

FIG. 3 is a flowchart of a touch detection method according to an exemplary embodiment within one frame section. The touch detection method of FIG. 3 may be carried out by the touch device 10 described with reference to FIG. 1 and FIG. 2.

Referring to FIG. 3, the touch device 10 is driven in a first touch driving mode (S10). The first touch driving mode is a mode for detecting a touch input by touch objects (e.g., a finger and the like) other than the stylus pen 20. When the touch device 10 is driven in the first touch driving mode, the first driver/receiver 110 outputs driving signals to the plurality of first touch electrodes 111-1 to 111-*m*, and the second driver/receiver 120 may receive detection signals according to a touch from the plurality of second touch electrodes 121-1 to 121-*n*.

The controller 130 acquires first touch data of a touch object based on the received detection signals from the touch sensor 100 while the touch device 10 is driven in the first touch driving mode (S11). The first touch data acquired in the first touch driving mode may correspond to a touch input by a touch object (e.g., a user's body part (finger, palm, etc.,) or a passive or active type of stylus pen) other than the stylus pen 20. That is, the first touch data may be data corresponding to a capacitance change amount of a touch electrode, a change amount of a detection signal, an output of an analog-to-digital (ADC) converter (refer to ADCs 115 and 125, which will be described later), and the like.

When the first touch driving mode is terminated, the touch device 10 is driven in a second touch driving mode (S12). The second touch driving mode is a mode for detecting a touch input made by the stylus pen 20. When the touch device 10 is driven in the second driving mode, the first driver/receiver 110 and the second driver/receiver 120 may simultaneously apply driving signals to all of the plurality of first touch electrodes 111-1 to 111-*m* and the plurality of second touch electrodes 121-1 to 121-*n*. In addition, the resonance circuit 23 of the stylus pen 20 is resonated by the driving signals applied to the plurality of first touch electrodes 111-1 to 111-*m* and the plurality of second touch electrodes 121-1 to 121-*n*, and thus a resonance is generated and transmitted to the touch sensor 100 through the conductive tip 21. Accordingly, the first driver/receiver 110 may receive detection signals transmitted from the plurality of first touch electrodes 111-1 to 111-*m*, while the second driver/receiver 120 may receive detection signals transmitted from the plurality of second touch electrodes 121-1 to 121-*n*, and the first driver/receiver 110 and the second driver/receiver 120 may process the received detection signals and transmit the processed signals to the controller 130.

In the above description, in order to generate the resonance signal of the stylus pen 20 while the touch device 10 is driven in the second driving mode, the first driver/receiver 110 and the second driver/receiver 120 simultaneously apply the driving signals to the plurality of first touch electrodes 111-1 to 111-*m* and the plurality of second touch electrodes 121-1 to 121-*n*, but the driving signals may be simultaneously applied only to all of the plurality of first touch electrodes 111-1 to 111-*m* by the first driver/receiver 110 or may be simultaneously applied only to all of the plurality of second touch electrodes 121-1 to 121-*n* by the second driver/receiver 120. When the first driver/receiver 110 and the second driver/receiver 120 simultaneously apply the driving signals to the plurality of first touch electrodes 111-1 to 111-*m* and the plurality of second touch electrodes 121-1 to 121-*n*, it is assumed that the driving signal applied to the plurality of first touch electrodes 111-1 to 111-*m* and the driving signal applied to the plurality of second touch electrodes 121-1 to 121-*n* have the same phase, but this is not restrictive.

The controller 130 receives detection signals from the touch sensor 100 while the touch device 10 is driven in the second touch driving mode, and acquires second touch data that includes touch coordinates of the touch object based on the received detection signals (S13). The second touch data acquired in the second touch driving mode may correspond to a touch input by the stylus pen 20. That is, the second touch data are data of a capacitance change due to the touch sensor 100 touched by the stylus pen 20, a change in the detection signal, and an ADC output (or an output change).

Next, referring to FIG. 4, the driving signals applied in the first touch driving mode and the second touch driving mode, and a resonance signal of the stylus pen 20, will be described.

Figure 4:
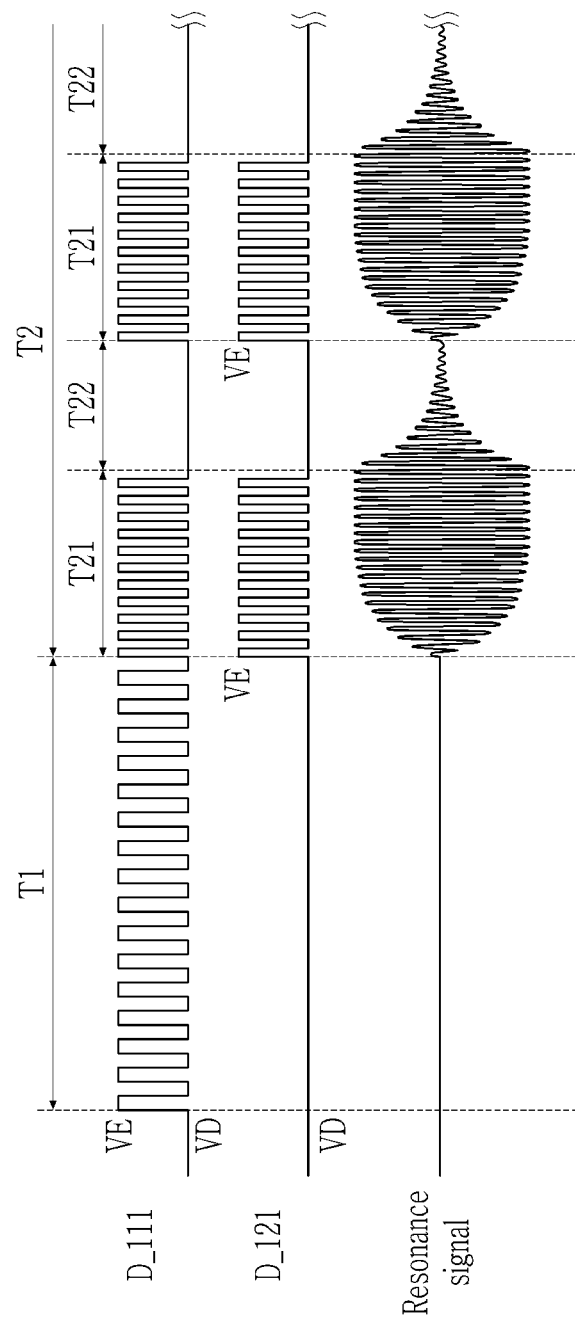
FIG. 4 is a waveform diagram of an example of a driving signal according to the touch detection method of FIG. 3.

FIG. 4 is a waveform diagram of an example of a driving signal according to the touch detection method of FIG. 3. In FIGS. 4, D_121 and D_111 are examples of driving signals respectively output from the first driver/receiver 110 and the second driver/receiver 120.

Referring to FIG. 4, in a first section T1 during which the touch device 10 is driven in the first touch driving mode, the first driver/receiver 110 outputs driving signals D_111 to the plurality of first touch electrodes 111-1 to 111-$m$. In addition, when the first driver/receiver 110 outputs the driving signals to the plurality of first touch electrodes 111-1 to 111-$m$, the second driver/receiver 120 receives detection signals from the plurality of second touch electrodes 121-1 to 121-$n$.

In a second section T2 during which the touch device 10 is driven in the second touch driving mode, the first driver/receiver 110 simultaneously applies the driving signals D_111 to the plurality of first touch electrodes 111-1 to 111-$m$ and the second driver/receiver 120 simultaneously applies the driving signals D_212 to the plurality of second touch electrodes 121-1 to 121-$n$.

In a first sub-section T21, frequencies of the driving signals D_111 applied to the plurality of first touch electrodes 111-1 to 111-$m$ and the driving signals D_121 applied to the plurality of second touch electrodes 121-1 to 121-$n$ correspond to a resonance frequency of the stylus pen 20. For example, during the first sub-section T21, the frequencies of the driving signals D_111 and D_121 output to the plurality of first touch electrodes 111-1 to 111-$m$ and the plurality of second touch electrodes 121-1 to 121-$n$ may be frequencies within an offset of 25 kHz around 500 kHz. On the contrary, in the first section T1, frequencies of the driving signals D_111 output to the plurality of first touch electrodes 111-1 to 111-$m$ are set to be different from the resonance frequency of the stylus pen 20. For example, frequencies of the driving signals D_111 output to the plurality of first touch electrodes 111-1 to 111-$m$ during the first section T1 may be set to be about 150 kHz. The frequency setting of the driving signal is only an example, and may be set to a different value from the above.

In a second sub-section T22 of the second section T2 during which the touch device 10 is driven in the second touch driving mode, the first driver/receiver 110 may receive detection signals from the plurality of first touch electrodes 111-1 to 111-$m$ and the second driver/receiver 120 may receive detection signals from the plurality of second touch electrodes 121-1 to 121-$n$. In the second sub-section T22, the resonance signal output by the resonance circuit 23 of the stylus pen 20 may be received by at least one of the plurality of first touch electrodes 111-1 to 111-$m$ and the plurality of second touch electrodes 121-1 to 121-$n$ even after application of the driving signal is terminated.

The second section T2 may include a plurality of first sub-sections T21 and a plurality of second sub-sections T22. For example, in the second section T2, a combination of the first sub-section T21 and the second sub-section T22 may repeat 8 times.

In the above description, the second section T2 exists after the first section T1, but the first section T1 may exist after the second section T2, time lengths of the first section T1 and the second section T2 may be changed within several frame sections, and the driving method of the touch device 10 of the exemplary embodiment is not limited thereto.

In addition, in the above description, the first section T1 and the second section T2 are included respectively once within on frame section, but a plurality of first sections T1 and a plurality of second sections T2 may be included within one frame section. In this case, the touch device 10 may acquire first touch data based on the detection signals received from the touch sensor 100 in the plurality of first sections T1 during which the touch device 10 is driven in the first touch driving mode, and may acquire second touch data based on the detection signals received from the touch sensor 100 in the plurality of first sections T1 during which the touch device 10 is driven in the second touch driving mode.

In addition, in the above description, the first driver/receiver 110 and the second driver/receiver 120 receive the detection signals in the second sub-section T22, but the first driver/receiver 110 and the second driver/receiver 120 may receive the detection signals through the plurality of first touch electrodes 111-1 to 111-$m$ and the plurality of second touch electrodes 121-1 to 121-$n$ in the first sub-section T21.

Next, referring to FIG. 5 to FIG. 7, operations of the first and second driver/receivers 110 and 120 in the touch device 10 of FIG. 1 will be described in detail.

Figure 5:
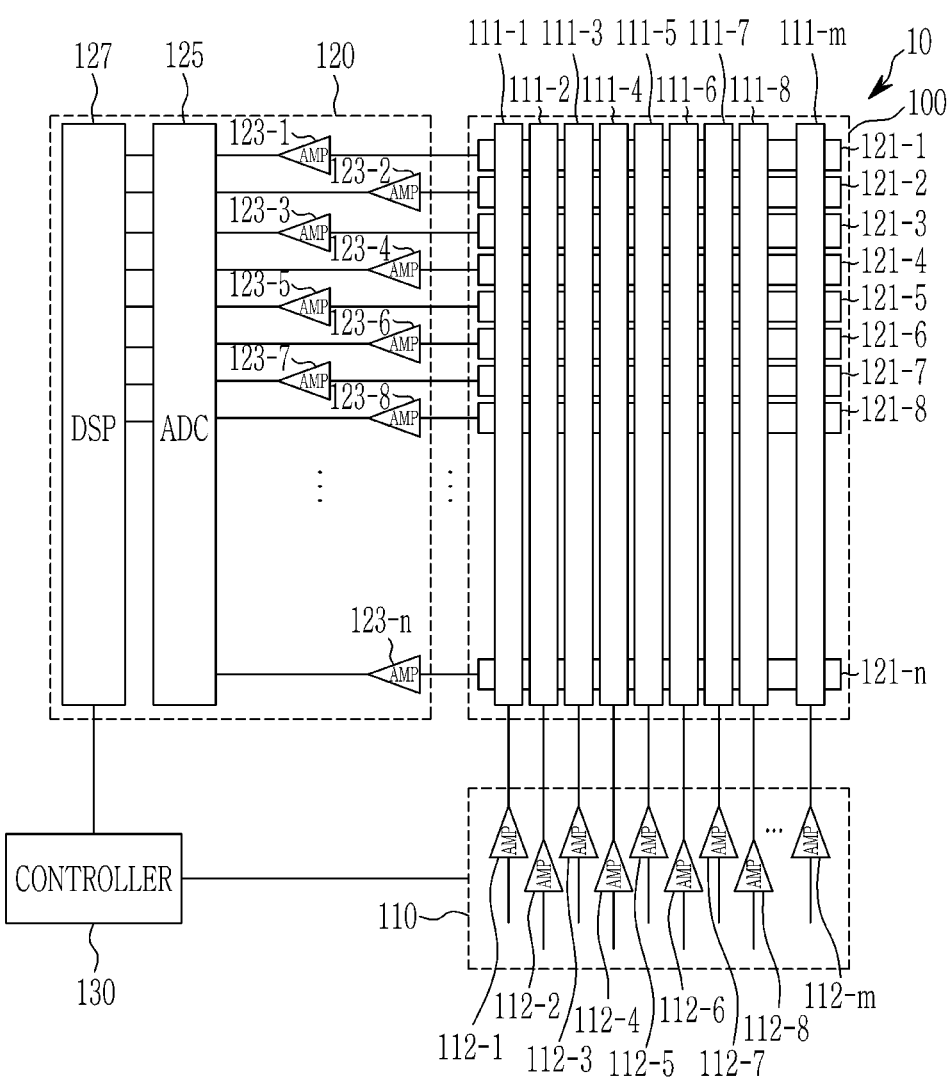
FIG. 5 shows the operation of the first and second driver/receivers in the first section of FIG. 4 in more detail.
Figure 6:
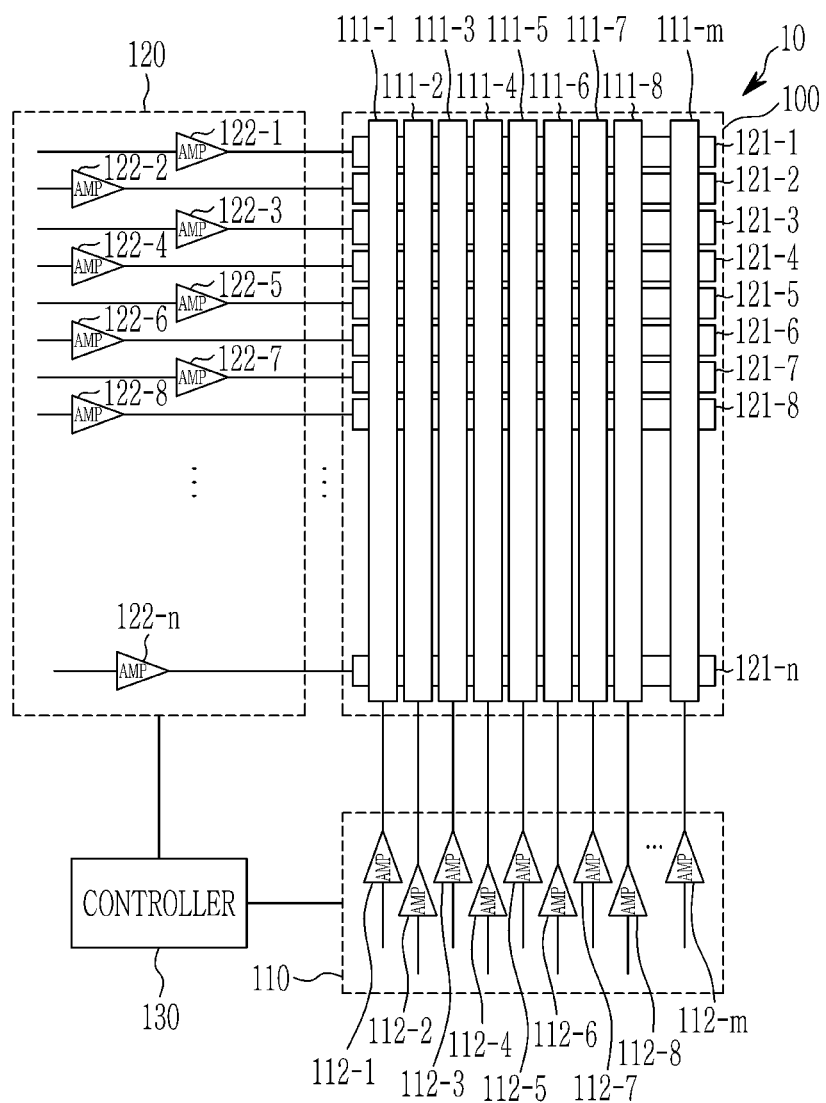
FIG. 6 shows the operation of the first and second driver/receivers in the first sub-section of the second section of FIG. 4 in detail.
Figure 7:
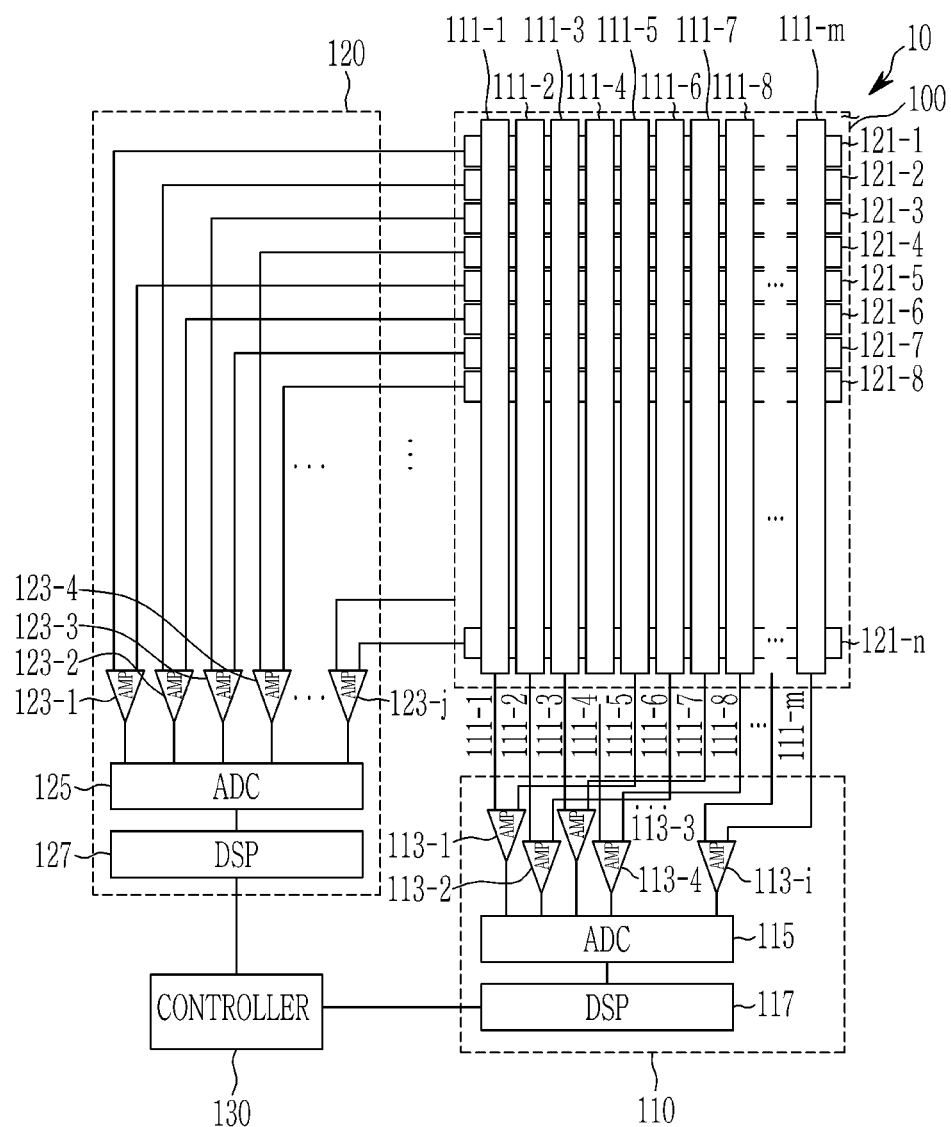
FIG. 7 shows the operation of the first and second driver/receivers in the second sub-section of the second section of FIG. 4 in detail.

Referring to FIG. 5 to FIG. 7, the first driver/receiver 110 includes a plurality of amplifiers 112-1 to 112-$m$, a plurality of differential amplifiers 113-1 to 113-$i$, an analog to digital converter (ADC) 115, and a signal processor (DSP) 117.

In addition, the second driver/receiver 120 includes a plurality of first amplifiers 122-1 to 122-$n$, a plurality of second amplifiers (or a plurality of differential amplifiers) 123-1 to 123-$j$, an ADC 125, and a signal processor (DSP) 127.

FIG. 5 shows the operation of the first and second driver/receivers 110 and 120 in the first section T1 of FIG. 4 in more detail.

Referring to FIG. 5, each of the plurality of amplifiers 112-1 to 112-$m$ included in the first driver/receiver 110 is connected to one corresponding first touch electrode among the plurality of first touch electrodes 111-1 to 111-$m$ through a touch channel and outputs a driving signal in the first section T1.

In addition, each of the plurality of second amplifiers 123-1 to 123-$n$ included in the second driver/receiver 120 is connected to one corresponding second touch electrode among the plurality of second touch electrodes 121-1 to 121-$n$ through a touch channel and receives a detection signal in the first section T1. Each of the plurality of second amplifiers 123-1 to 123-$n$ may be implemented as an amplifier of which one of two input ends is connected with a ground or a DC voltage, and a detection signal of the corresponding second input electrode is input to the other input. That is, each of the plurality of second amplifiers 123-1 to 123-$n$ amplifies and outputs a detection signal transmitted from the plurality of second touch electrodes 121-1 to 121-$n$ in parallel.

The ADC 125 of the second driver/receiver 120 converts the detection signals amplified by the plurality of second amplifiers 123-1 to 123-$n$ into detection data, which are digital signals in the first section T1. That is, when the amplified detection signals are input from the plurality of second amplifiers 123-1 to 123-$n$, the ADC 125 converts the input signals into detection data through periodic sampling.

The signal processor 127 processes the detection data converted into the digital signals by the ADC 125, and transmits the processed data to the controller 130.

FIG. 6 shows the operation of the first and second driver/receivers 110 and 120 in the first sub-section T21 of the second section T2 of FIG. 4 in detail.

Referring to FIG. 6, each of the plurality of amplifiers 112-1 to 112-*m* included in the first driver/receiver 110 in the first sub-section T21 is connected to a corresponding first touch electrode among the plurality of first touch electrodes 11-1 to 111-*m* through a touch channel, and outputs a driving signal. In addition, each of the plurality of first amplifiers 112-1 to 122-*n* included in the second driver/receiver 120 is connected to a corresponding second touch electrode among the plurality of second touch electrodes 121-1 to 121-*n* through a touch channel, and outputs a driving signal.

FIG. 7 shows the operation of the first and second driver/receivers 110 and 120 in the second sub-section T22 of the second section T2 of FIG. 4 in detail.

Referring to FIG. 7, in the second sub-section T22, each of the plurality of differential amplifiers 113-1 to 113-*i* included in the first driver/receiver 110 and the plurality of differential amplifiers 123-1 to 123-*j* included in the second driver/receiver 129 are respectively connected to two touch electrodes of which input terminals are disposed apart from each other. In addition, each of the differential amplifiers 113-1 to 113-*i* and 123-1 to 123-*j* may differentially amplify two detection signals transmitted from corresponding touch electrodes and output the differentially amplified signals. Each of the differential amplifiers 113-1 to 113-*i* and 123-1 to 123-*j* receive detection signals from two touch electrodes and differentially amplifies the received detection signals, and thus saturation does not occur even through driving signals are simultaneously applied to a plurality of touch electrodes.

Each of the differential amplifiers 113-1 to 113-*i* and 123-1 to 123-*j* may receive detection signals from two touch electrodes that are separated from each other rather than being adjacent to each other. For example, each of the differential amplifiers 113-1 to 113-*i* and 123-1 to 123-*j* may receive detection signals from two touch electrodes that are disposed apart from each other, while disposing one or more touch electrodes therebetween.

In FIG. 7, for example, the differential amplifier 113-1 receives detection signals from the touch electrode 111-1 and the touch electrode 111-5. When the differential amplifier 113-1 receives detection signals from two touch electrodes that are adjacent to each other (e.g., a first touch electrode 111-1 and a first touch electrode 111-2), detection signals caused by a touch in an area between the first touch electrode 111-1 and the first touch electrode 111-2 do not have sufficiently large values even though they are differentially amplified by the differential amplifier 113-1. Therefore, when the differential amplifier 113-1 is connected to the two adjacent touch electrodes, touch sensitivity is deteriorated. However, since the differential amplifier 113-1 receives detection signals from the first touch electrode 111-1 and the first touch electrode 111-5, the detection signal caused by the touch electrode at the touch input position can be differentially amplified to have a sufficiently large value, thereby improving touch sensitivity.

In the second sub-section T22, the ADC 115 of the first driver/receiver 110 and the ADC 125 of the second driver/receiver 120 convert the signals amplified by the corresponding differential amplifiers among the plurality of differential amplifiers 113-1 to 113-*i* and 123-1 to 123-*j* to detection data, which are digital signals. That is, when the amplified signals are input from the plurality of differential amplifiers 113-1 to 113-*l*, the ADC 115 converts the input signals to detection data through periodic sampling, and when the amplified signals are input from the plurality of differential amplifiers 123-1 to 123-*j*, the ADC 125 converts the input signals to detection data through periodic sampling.

In addition, each of the signal processors 117 and 127 signal-processes the detection data output from the ADCs 115 and 125 and transmits the signal-processed data to the controller 130.

The plurality of differential amplifiers 113-1 to 113-*i* and 123-1 to 123-*j* may be formed by changing connections of input ends of the plurality of amplifiers 123-1 to 123-*n*. That is, i+j=n. Specifically, an input end connected with the ground or a DC voltage among two input ends of an amplifier 123-1 is connected to a second touch electrode 121-4, and an input end connected with the ground or the DC voltage among two input ends of an amplifier 123-1 is connected to a second touch electrode 121-5, such that two touch electrodes may be connected to one amplifier.

Next, referring to FIG. 8 to FIG. 11, the touch detection method of FIG. 3 will be described in detail.

Figure 8:
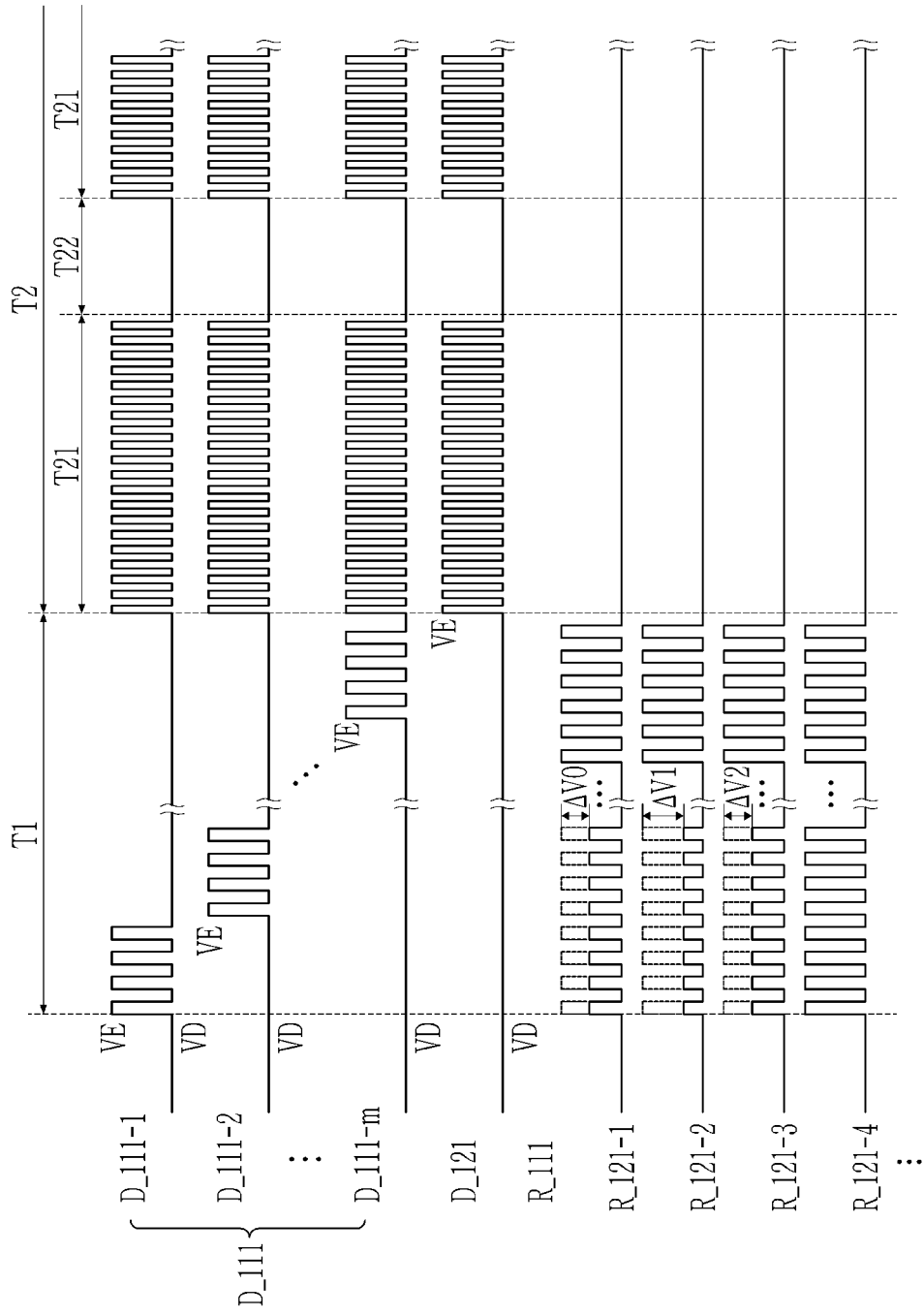
FIG. 8 is a waveform diagram of an example of a driving signal and a receiving signal according to the touch detection method of FIG. 3.
Figure 9:
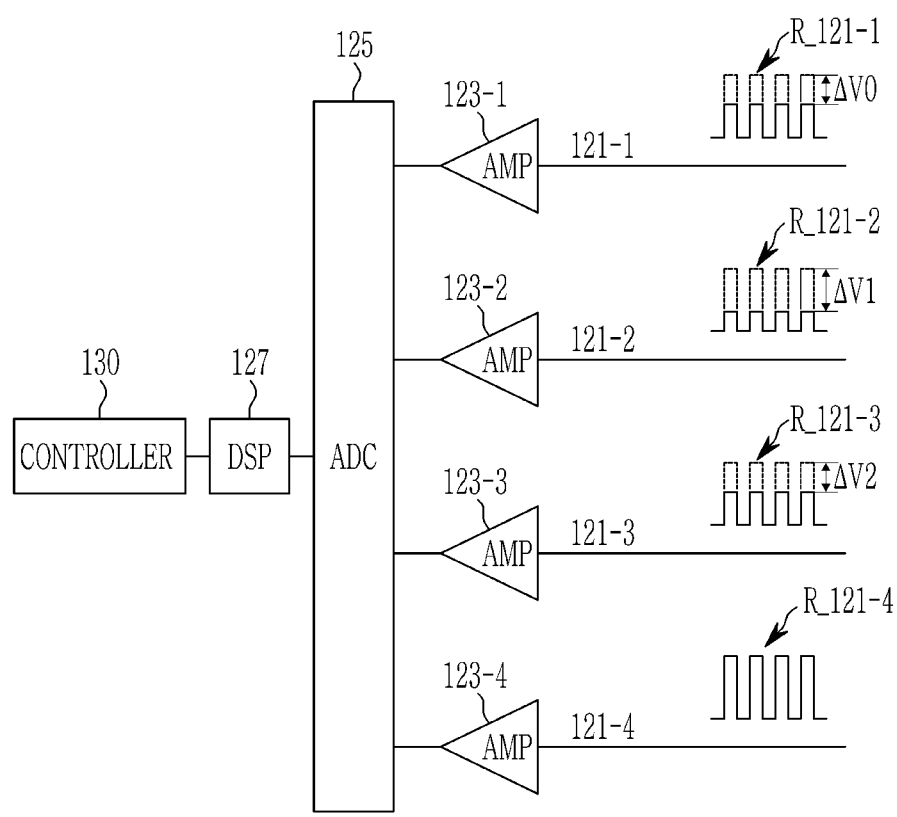
FIG. 9 shows an example of processing of a detection signal in a first section of FIG. 8.

FIG. 8 is a waveform diagram of an example of a driving signal and a receiving signal according to the touch detection method of FIG. 3, and FIG. 9 shows an example of processing of a detection signal in a first section T1 of FIG. 8. In FIG. 8 and FIG. 9, it is assumed that a touch is made by a finger in an area where the first touch electrodes 111-1 and 111-2 and the second touch electrodes 121-1, 121-2, and 121-3 cross each other.

In FIG. 8, the driving signals D_111 and D_121 applied to the first touch electrodes 111-1 and 111-2 and the second touch electrodes 121-1, 121-2, and 121-3 include a frequency signal having an enable level voltage VE and a frequency signal having a disable level voltage VD. Meanwhile, in FIG. 8, the driving signals D_111 and D_121 are frequency signals of a pulse waveform, but the waveform of the driving signal is not limited thereto.

In the first section T1, a plurality of driving signals D_111-1 to D_111-*m* are sequentially applied to the plurality of first touch electrodes 111-1 to 111-*m*. In addition, the second driver/receiver 120 receives detection signals R_121-1 to R_121-*n* from the plurality of second touch electrodes 121-1 to 121-*n*.

In the first section T1, the driving signals D_111-1 to D_111-*m* applied to the plurality of first touch electrodes 111-1 to 111-*m* are driving signals for detection of a touch made by a touch object other than the stylus pen 20.

In FIG. 8, it is illustrated that the driving signals D_111-1 to D_111-*m* having the same frequency are sequentially applied to the plurality of first touch electrodes 111-1 to 111-*m* during the first section T1, but driving signals having different frequencies (e.g., frequencies in orthogonal relationship) may be simultaneously applied to the plurality of first touch electrodes 111-1 to 111-*m*. In this case, the second driver/receiver 120 receives a detection signal according to a touch from the plurality of second touch electrodes 121-1 to 121-*n*, and may separate detection signals into the first touch electrodes 111-1 to 111-*m* using band pass filters of different frequency bandwidth.

As shown in FIG. 9, in the first section T1, a detection signal R_121-1 from a second touch electrode 121-1 is amplified by a corresponding amplifier 123-1 and then output, a detection signal R_121-2 from a second touch electrode 121-2 is amplified through a corresponding amplifier 123-1 and then output, a detection signal R_121-3 from a second touch electrode 121-3 is amplified through a corresponding amplifier 123-1 and then output, and a detection signal R_121-4 from a second touch electrode 121-4 is amplified through a corresponding amplifier 123-1 and then output. The detection signals amplified by the respective amplifiers 123-1, 123-2, 123-3, and 123-4 are converted into detection data, which are digital signals, by the ADC 125, and then processed by the signal processor 127 and transmitted to the controller 130.

When the detection data are input, the controller 130 may detect a change in signal intensity (amplitude) of each detection signal therefrom. In addition, a point at which the first touch electrode to which the driving signal is applied when the signal amplitude change occurs and the second touch electrode where the signal amplitude change occurs can be acquired as touch coordinates. In FIG. 8, for example, while the driving signals are applied to the first touch electrodes 111-1 and 111-2, the signal amplitude changes by touch are respectively occur with $\Delta V0$, $\Delta V1$, and $\Delta V2$ in the detection signals R_121-1, R_121-2, and R_121-3 received from the second touch electrodes 121-1, 121-2, and 121-3. Thus, the point where the first touch electrodes 111-1 and 111-2 and the second touch electrodes 121-1, 121-2, and 121-3 intersect can be obtained as touch coordinates.

Referring back to FIG. 8, in the first sub-section T21 in the second section T2, the plurality of first touch electrodes 111-1 to 111-*m* and the plurality of second touch electrodes 121-1 to 121-*n* are all applied with the driving signals D_111 and D_121. During the first sub-section T21, the driving signals D_111 and D_121 applied to the plurality of first touch electrodes 111-1 to 111-*m* and the plurality of second touch electrodes 121-1 to 121-*n* are frequency signals having a similar frequency to a resonance frequency of the stylus pen 20.

In the second sub-section T22, the first driver/receiver 110 and the second driver/receiver 120 may receive detection signals from all of the plurality of first touch electrodes 111-1 to 111-*m* and the plurality of second touch electrodes 121-1 to 121-*n*.

The second section T2 may include a plurality of first sub-sections T21 and a plurality of second sub-sections T22. For example, in the second section T2, a combination of the first sub-section T21 and the second sub-section T22 may repeat eight times.

In FIG. 8, a touch is made by the stylus pen 20, and therefore no detection signal is received in the second sub-section T22.

Figure 10:
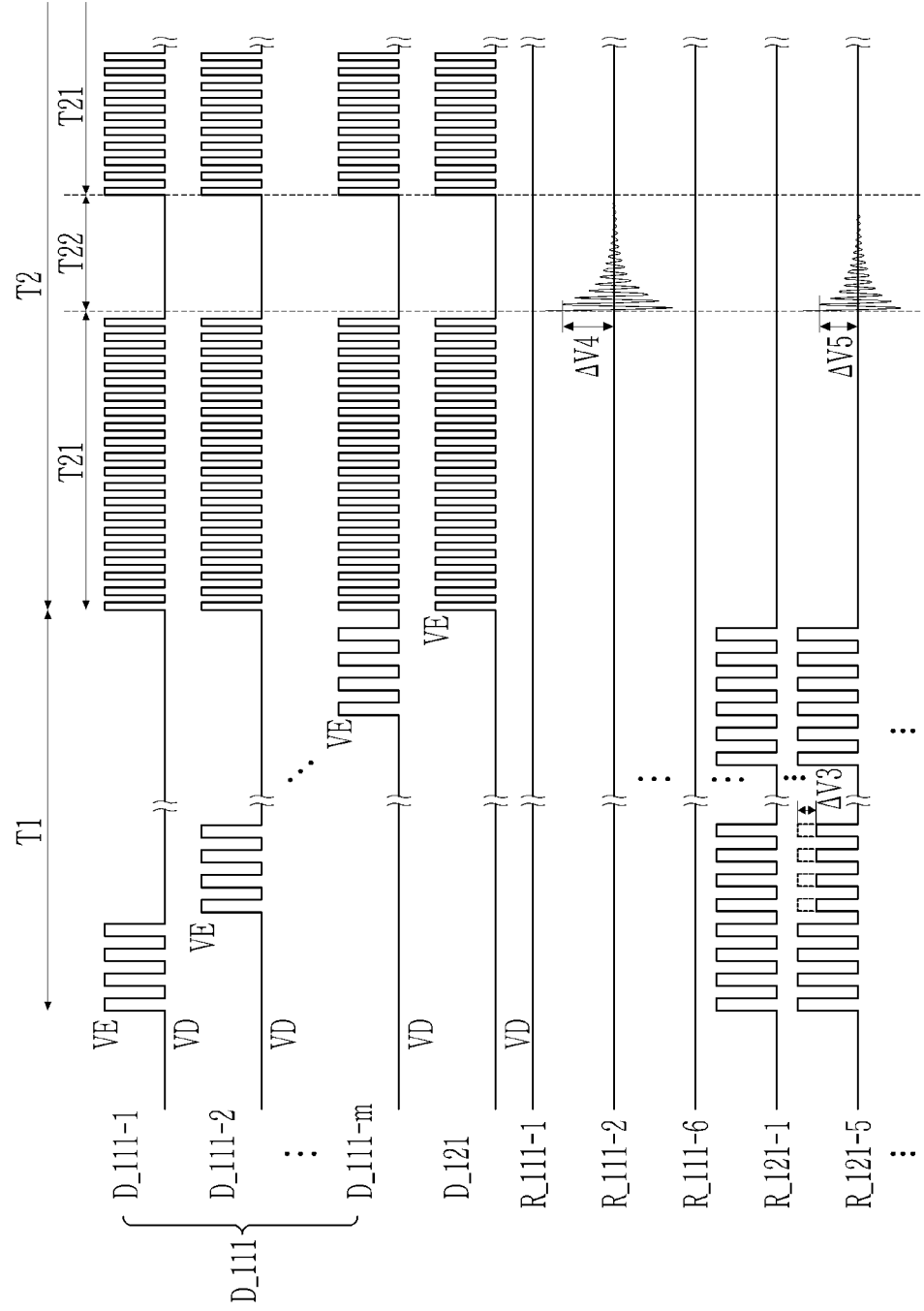
FIG. 10 is a waveform of another example of the driving signal and the receiving signal according to the touch detection method of FIG. 3.
Figure 11:
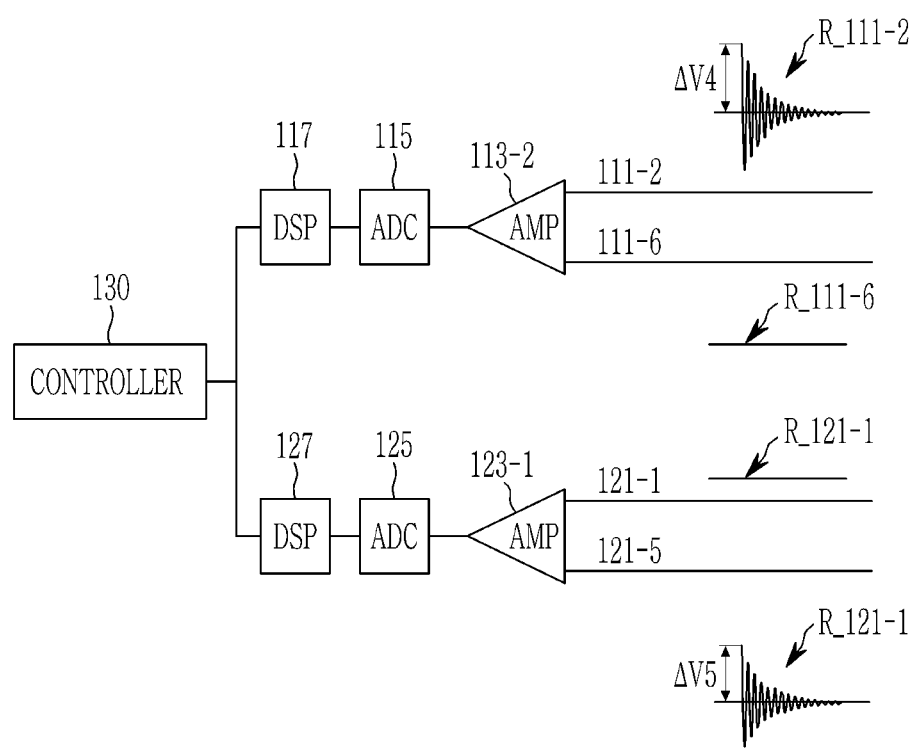
FIG. 11 shows an example of processing of a detection signal in the second section of FIG. 1.

FIG. 10 is a waveform of another example of the driving signal and the receiving signal according to the touch detection method of FIG. 3, and FIG. 11 shows an example of processing of a detection signal in the second section T2 of FIG. 10. In FIG. 10 and FIG. 11, it is assumed that there is a touch made by the stylus pen 20 in an area where the first touch electrode 111-2 and the second touch electrode 121-5 intersect.

In FIG. 10, as in FIG. 8, the driving signals D_111 and D_121 applied to the first touch electrodes 111-1 and 111-2 and the second touch electrodes 121-1, 121-2, and 121-3 include the frequency signal having the enable level voltage VE and the frequency signal having the disable level voltage VD. Meanwhile, in FIG. 10, the driving signals D_111 and D_121 are shown as a frequency signal of a pulse waveform, but the waveform of the driving signal is not limited to this.

Referring to FIG. 10, the driving signals D_111-1 to D_111-*m* are sequentially applied to the plurality of first touch electrodes 111-1 to 111-*m* in the first section T1. In addition, the second driver/receiver 120 receives the detection signals R_121-1 to R_121-*n* from the plurality of second touch electrodes 121-1 to 121-*n*.

Since the stylus pen 20 is close to the second touch electrode 121-5, in the first section T1, the signal amplitude change value $\Delta V3$ of the detection signal R_121-5 from the second touch electrode 121-5 where a touch is made may be amplified through the amplifier 123-5 and then output.

Next, in the first sub-section T21 of the second section T2, all the plurality of first touch electrodes 111-1 to 111-*m* and the plurality of second touch electrodes 121-1 to 121-*n* are applied to the driving signals D_111 and D_121. The driving signals D_111 and D_121 applied to the plurality of first touch electrodes 111-1 to 111-*m* and the plurality of second touch electrodes 121-1 to 121-*n* during the first sub-section T21 are frequency signals having a frequency that is similar to the resonance frequency of the stylus pen 20.

In the first sub-section T21, receiving of detection signals from the plurality of first touch electrodes 111-1 to 111-*m* and the plurality of second touch electrodes 121-1 to 121-*n* is not carried out.

Next, when the first sub-section T21 is terminated, the first driver/receiver 110 and the second driver/receiver 120 stop application of the driving signal. That is, a driving signal is not applied to the plurality of first touch electrodes 111-1 to 111-*m* and the plurality of second touch electrodes 121-1 to 121-*n* during the second sub-section T22 following the first sub-section T21.

In the second sub-section T22, the first driver/receiver 110 and the second driver/receiver 120 may receive detection signals from all of the plurality of first touch electrodes 111-1 to 111-*m* and the plurality of second touch electrodes 121-1 to 121-*n*. The first driver/receiver 110 and the second driver/receiver 120 may receive a pen resonance signal in the second sub-section T22 during which the driving signals D_111 and D121 are not applied, as a detection signal.

As shown in FIG. 11, in the second sub-section T22, the detection signals R_111-2 and R_125-5 received from the first touch electrode 111-2 and the second touch electrode 121-5 of an area touched by the stylus pen 20 may be amplified by respectively corresponding differential 113-2 and 123-1 and then output. In each of the differential amplifiers 113-2 and 123-1, detection signals received from the touch electrodes 111-6 and 121-1 in an area where a touch is not made are input in addition to the detection signals, and accordingly, signals output from the respective 113-2 and 123-1 substantially correspond to signals amplified from the detection signals R_111-2 and R_121-5 received from the first touch electrode 111-2 and the second touch electrode 121. The detection signals amplified by the respective differential amplifiers 113-2 and 123-1 are converted to detection signals, which are digital signals, by the corresponding ADCs 115 and 125, and then transmitted to the controller 130.

When the detection data are input, the controller 130 may detect an effective touch signal having signal intensity (amplitude) of a predetermined value or higher among detection signals. In addition, the controller 130 may acquire touch coordinates from a position of touch electrodes detected as an effective touch signal. In FIG. 10, for example, detection signals of the predetermined value or higher are received in the first touch electrode 111-2 and the second touch electrode 121-5. Therefore, a point at which the first touch electrode 111-2 and the second touch electrode 121-5 intersect can be obtained as touch coordinates.

The touch device 10 according to the exemplary embodiment receives detection signals through all of the plurality of first touch electrodes 111-1 to 111-*m* and the plurality of second touch electrodes 121-1 to 121-*n* in the second sub-section T22, and thus there is a merit that touch coordinates along two axes intersecting each other can be acquired in a short time.

In addition, the same driving signals D_111 and D_121 are simultaneously applied to all of the plurality of first touch electrodes 111-1 to 111-$m$ and the plurality of second touch electrodes 121-1 to 121-$n$ in the first sub-section T21, and accordingly resonance signal intensity of the stylus pen 20 can be improved.

In the above description, detection signal receiving in the second sub-section T22 may be performed at least once by at least one of the first driver/receiver 110 and the second driver/receiver 120. In addition, the time of receiving the detection signal may be at least one time in the second sub-section T22, but is not limited thereto.

According to the exemplary embodiments, when acquiring first touch data or second touch data, the touch device 10 detects touch coordinates from the acquired data as previously described, and transmits touch data including touch coordinates to a host device at every predetermined touch report period. In the present specification, the touch report period represents a period in which the touch device 10 outputs touch data to an external host apparatus (not shown) to report the touch data obtained by driving the touch sensor 100 to the host apparatus.

The touch data will be described with reference to FIG. 12 and FIG. 13.

Figure 12:
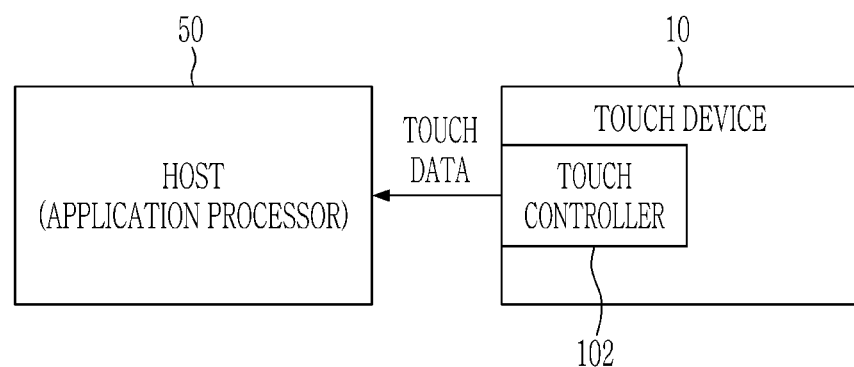
FIG. 12 is a block diagram of a touch device and a host according to an exemplary embodiment.
Figure 13:
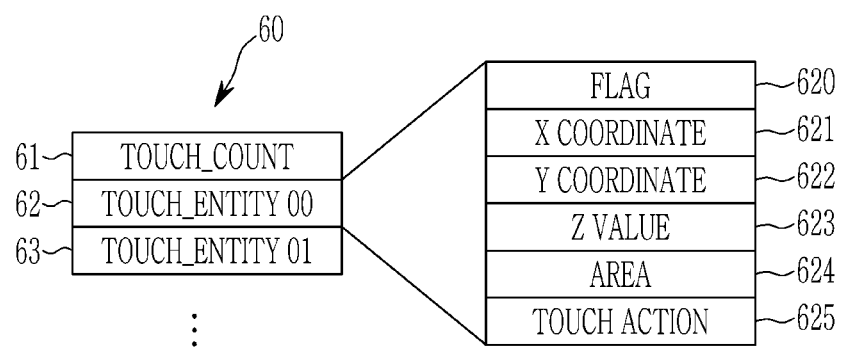
FIG. 13 shows an example of touch data provided to the host from the touch device.

FIG. 12 is a block diagram of a touch device and a host according to an exemplary embodiment, and FIG. 13 shows an example of touch data provided to the host from the touch device.

Referring to FIG. 12, a host 50 may receive touch data from a touch controller 102 included in a touch device 10. For example, the host 50 may be a mobile system-on-chip (SoC), an application processor (AP), a media processor, a microprocessor, a central processing unit (CPU), or a similar device.

The touch device 10 may generate information about a touch input during one frame period as touch data and transmit them to the host 50 after the frame period ends.

Referring to FIG. 13, the touch data 60 may include a touch count field 61 and at least one of touch entity fields 62 and 63.

A value that indicates a number of touches input during one frame period may be written into the touch count field 61. For example, in the first section T1 of one frame period, touch coordinates by a single finger are calculated and touch coordinates by a single stylus pen are calculated in a second section T2, and a value that indicates an input of two touches is written into the touch count field 61.

The touch entity fields 62 and 63 respectively include fields indicating touch input information. For example, the touch entity fields 62 and 63 include a flag field 620, an X-axis coordinate field 621, a Y-axis coordinate field 622, a Z value field 623, an area field 624, and a touch action field 625.

The number of touch entity fields 62 and 63 may be the same as a value written into the touch count field 61.

A value indicating a touch object may be written into the flag field 620. For example, a finger, a palm, and a stylus pen may be written in the flag field 620 with different values. Values indicating calculated touch coordinates may be respectively written into the X-axis coordinate field 621 and the Y-axis coordinate field 622. A value corresponding to signal intensity of a detection signal may be written into the Z value field 623. A value corresponding to the area of a touched area may be written into the area field 624.

According to exemplary embodiments, the host 50 receiving touch data 60 determines that a touch object is a finger 30 when the touch area is larger than a threshold value, and determines that the touch object is the stylus pen 20 when the touch area is smaller than the threshold value by using the value in the area field 624.

Alternatively, according to the exemplary embodiments, the host 50 received the touch data 60 may identify whether the touch object is the finger 30 or the stylus pen 20 by using a value in the flag field 620.

Meanwhile, there are various reasons that cause a noise in the touch device 10, and the noise may cause deterioration of detection performance of the touch device 10. In particular, in case of the stylus pen 20, when there is noise having a frequency bandwidth similar to the resonance frequency of the stylus pen 20, the precision of touch detection may be greatly reduced.

Next, referring to FIG. 14, a phenomenon in which noise affects touch detection will be described.

Figure 14:
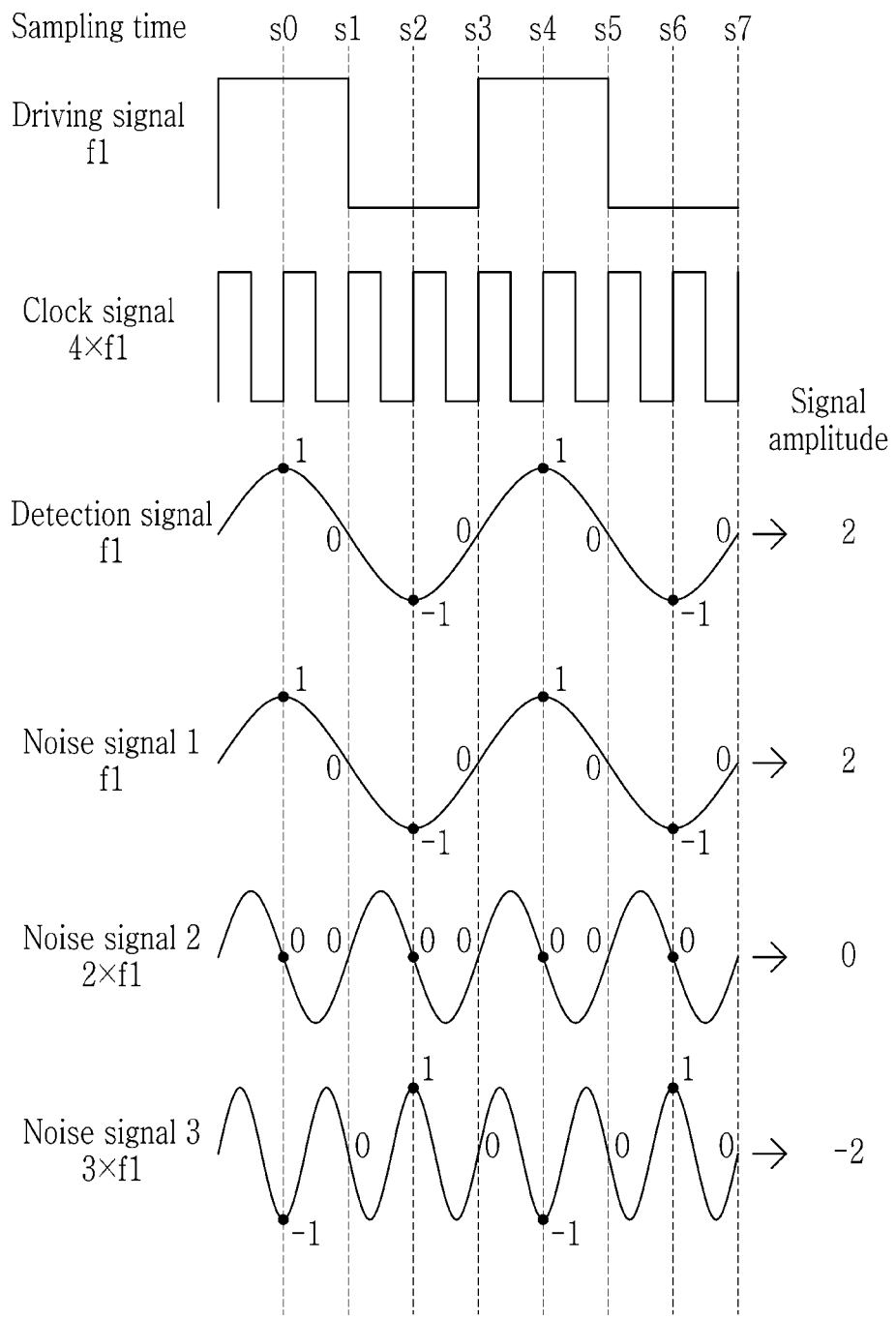
FIG. 14 is provided for description of an effect of noise with respect to touch detection performance of the touch device.

FIG. 14 is provided for description of an effect of noise with respect to touch detection performance of the touch device, and shows a case in which a noise signal having a frequency that is the same as, or two or three times the frequency of the driving signal applied to the touch sensor 100 is generated for resonance of the stylus pen 20.

Referring to FIG. 14, in the touch device 10, in order to acquire signal intensity, that is, an amplitude of a detection signal, synchronization occurs by a clock signal of which a frequency is n times the frequency of the driving signal, for example, four times the frequency of the driving signal, such that a signal value of the detection signal at a plurality of sampling points s0 to s7 is sampled. In addition, the amplitude of the detection signal is acquired by using at least a part of the sampled signal values. In FIG. 14, for example, the amplitude of the detection signal is acquired by using a difference value ΔI between the sampled signal value 1 at s0 and a sampled signal value −1 at s2.

As shown in FIG. 14, when the touch sensor 100 is touched by the stylus pen 20, the amplitude ΔI of the detection signal output from the touched electrode becomes 2.

Likewise, noise signal 1 having the same frequency as the frequency f1 of the driving signal also has a sampled signal value of 1 at the sampled time s0, and has a signal value of −1 at the sampled time s2 such that a difference value ΔI between the two values also becomes 2. In addition, noise signal 3 having a frequency of three times the frequency f1 of the driving signal has a sampled signal value of −1 at the sampled time s0 and a signal value 1 at the sampled time s2 such that a difference value ΔI between the two values becomes −2.

Thus, when the noise signal 1 or the noise signal 3 occurs in time synchronization with the driving signal, the signal value of the noise signal 1 or the noise signal 3 affects obtaining the amplitude of the detection signal, which is a factor that degrades the touch detection performance.

Therefore, in order to solve this problem in the exemplary embodiment described later, in the second touch driving mode of FIG. 3, driving signals output to the touch sensor 100 include two types of driving signals having different phases from each other, and different codes are applied according to the phase of the corresponding driving signal in the process of obtaining the amplitude of the detection signal such that the effect of the noise signal is removed from the detection signal.

Hereinafter, referring to FIG. 15 to FIG. 18, the touch detection method (refer to S12 and S13 of FIG. 3) while the touch device 10 operates in the second touch driving mode will be described in more detail.

Figure 15:
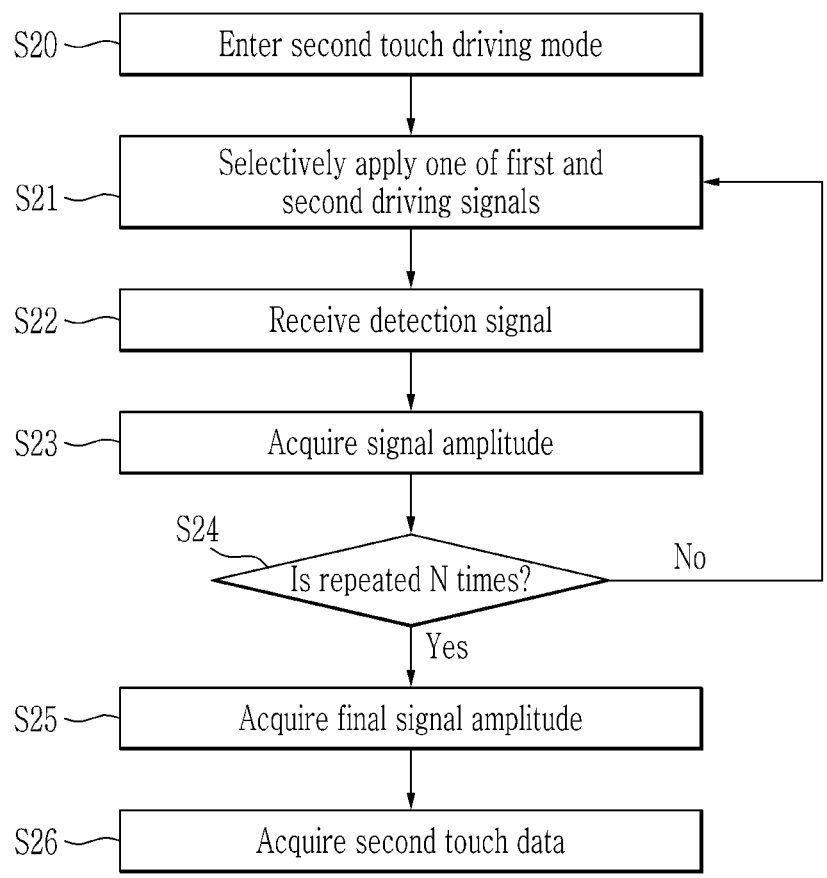
FIG. 15 is a flowchart of the touch detection method of the touch device according to the exemplary embodiment operates in the second touch driving mod.
Figure 16:
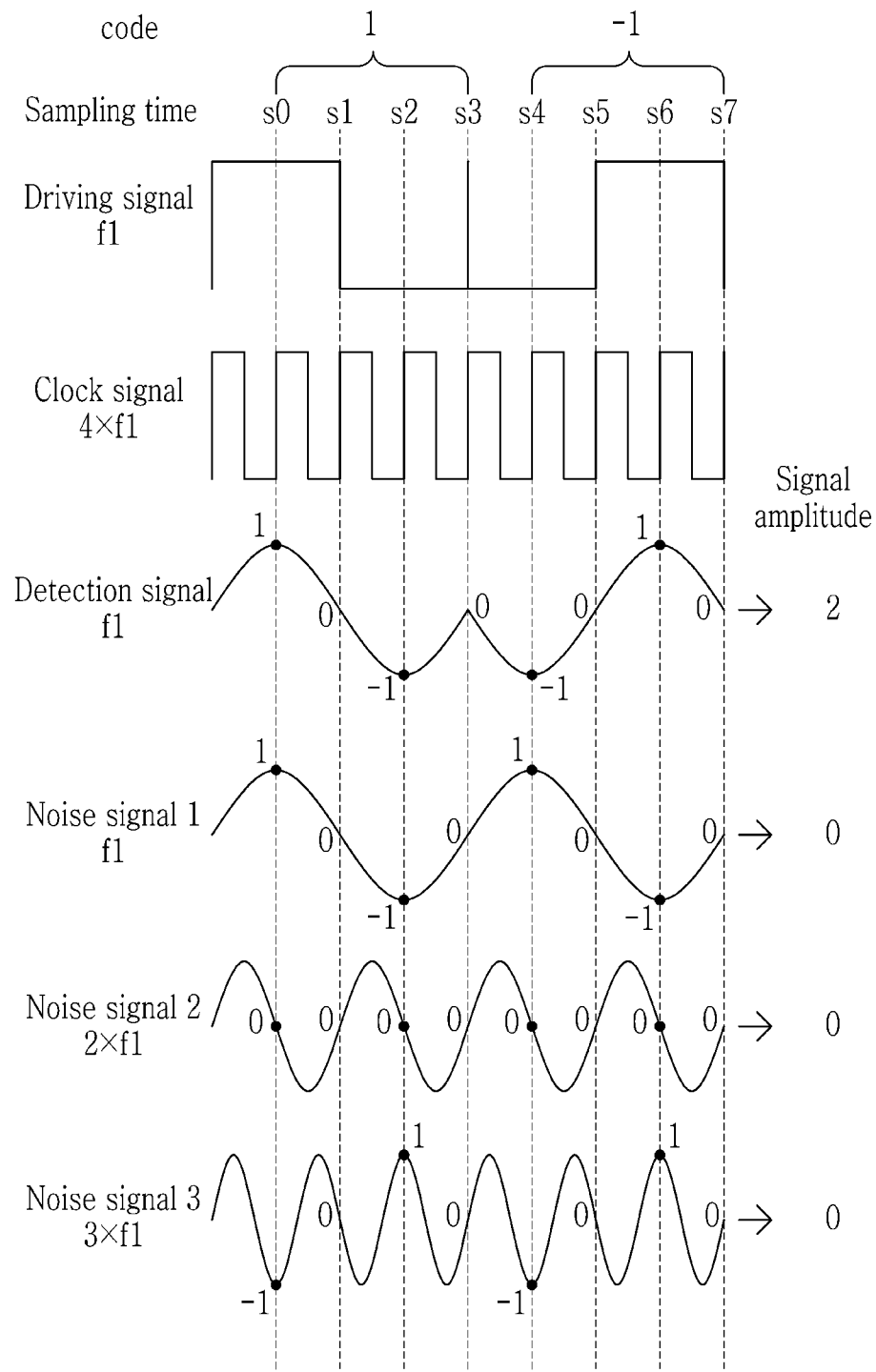
FIG. 16 is provided for description of noise filtering in the touch detection method of FIG. 15.

FIG. 15 is a flowchart of the touch detection method of the touch device according to the exemplary embodiment operates in the second touch driving mode. In addition, FIG. 16 is provided for description of noise filtering in the touch detection method of FIG. 15.

Referring to FIG. 15, the controller 130 of the touch device 10 controls the first and second driver/receivers 110 and 120 to output a driving signal to the touch sensor 100 for generation of the resonance signal of the stylus pen 20 as the touch device 10 enters the second touch driving mode for detection of a touch of the stylus pen 20.

Therefore, the first driver/receiver 110 and the second driver/receiver 120 selectively apply one of the first and second driving signals, which have a frequency that is similar to the resonant frequency of the stylus pen 20 and are different from each other in phase, to the touch sensor 100 (S21). That is, the first and second driver/receivers 110 and 120 select one of the first and second driving signals that are different from each other in phase, for example, the first and second driving signals having opposite phases, according to a predetermined order or pattern, and outputs the selected driving signal to all the plurality of first and second touch electrodes 111-1 to 111-$m$ and 121-1 to 121-$n$ during a predetermined section (refer to the first sub-section T21 of FIG. 4).

In addition, the first and second driver/receivers 110 and 120 receive (S22) detection signals from the touch sensor 100, that is, the plurality of first touch electrodes 111-1 to 111-$m$ and the plurality of second touch electrodes 121-1 to 121-$n$, and transmit the received signals to the controller 130. For example, in a predetermined section after termination of the driving signal application in the step S21 (refer to the second sub-section T22 of FIG. 4), the first driver/receiver 110 may receive detection signals to the touch sensor 100 from the plurality of first touch electrodes 111-1 to 111-$m$ and the second driver/receiver 120 may receive detection signals from the plurality of second touch electrodes 121-1 to 121-$n$. In this case, the first and second driver/receivers 110 and 120 (differentially) amplify detection signals received from the respective touch electrodes, convert the amplified signals to detection data, which are digital signals, and transmit the detection data to the controller 130.

Here, the detection data are data obtained by sampling signal values of the detection signal through the ADCs 115 and 125 of the first and second drivers/receivers 110 and 120. In FIG. 16, for example, the ADCs 115 and 125 of the first and second driver/receivers 110 and 120 may be synchronized with a clock signal of which a frequency is n times, for example, four times (4×f1) the frequency f1 of the driving signal, and sample the detection signals at a plurality of times s0 to s3 and s10 to s13. At least one of the sampling times s0 to s3 and s10 to s13 in the present disclosure may be any timing that can be periodically set in relation to the frequency of the driving signal.

When receiving detection data corresponding to a detection signal received from each touch electrode from the first and second driver/receivers 110 and 120, the controller 130 acquires intensity, that is, amplitude of each detection signal, by using the detection data (S23).

In FIG. 16, for example, the controller 130 calculates signal intensity of a detection signal, that is, amplitude of the detection signal, by using at least a some of signal values sampled by the first and second driver/receivers 110 and 120. For example, the controller 130 calculates the signal intensity of the detection signal by using a signal value difference between the signals sampled at s0 and s2 and a signal value difference between the signals sampled at s4 and s6. Accordingly, amplitude of a detection signal is received in response to a driving signal in the positive phase becomes +2, which is a signal value difference between the signal value 1 sampled at s0 and the signal value −1 sampled at s2. On the other hand, amplitude of a detection signal received in response to a driving signal on the inverse phase becomes −2, which is a signal value difference between the signal value −1 sampled at s4 and the signal value 1 sampled at s6.

While the touch device 10 is driven in the second touch driving mode, the first and second driver/receivers 110 and 120 apply the driving signal to the touch sensor 100 (S21) and receive detection signals from the touch sensor 100 correspondingly (S22) such that the touch device 10 repeats acquiring of the signal intensity of the detections signals N times (S24). That is, while the touch device 10 is driven in the second touch driving mode, the first sub-section T21 during which the driving signal is applied and the second sub-section T22 during which the detection signal is received may repeat N times (e.g., 8 times).

After repeating the step S21 to the step S23 N times, the controller acquires the final signal intensity, that is, the final signal amplitude of each detection signal through the following Equation 1 (S25).

$$\text{signal amplitude} = \frac{\sum_{i=1}^{N}(\Delta I_i \times \text{code})}{\# \text{ of samples}} \quad \text{[Equation 1]}$$

In Equation 1, i corresponds to the turn of the step S21 to S23, $\Delta I_i$ implies signal amplitude acquired from the i-th repetition of the step S21 to the step S23, and "# of samples" corresponds to the number of times of acquisition of signal amplitude from the detection signal (i.e., the number of samples), that is, the number of repetitions of the step S21 to the step S23 during one second touch driving mode.

Referring to Equation 1, the sum ($\sum_{i=1}^{N}(\Delta I_i \times \text{code})$) of values obtained by multiplying amplitudes $\Delta I_i$ of detection signals acquired by applying a driving signal several times during the second touch driving mode by corresponding code is obtained, and then an average value is obtained by dividing the sum ($\sum_{i=1}^{N}(\Delta I_i \times \text{code})$) by the number of sampling times (# of samples). The final signal amplitude of a detection signal corresponding to each touch electrode corresponds to this average value. Here, the code has one value of a first value and a second value having the same absolute value and different signs. For example, the code has one of 1 and −1, and may be applied differently according to the phase of the corresponding driving signal. In FIG. 16, for example, code 1 is multiplied by a signal amplitude of a detection signal acquired by applying a driving signal (e.g., a first driving signal) of the positive phase to the touch sensor 100, and code −1 may be multiplied by a signal amplitude of a detection signal acquired by applying a driving signal (e.g., a second driving signal) of the reverse phase to the touch sensor 100.

Through the above-described method, final signal amplitude of a detection signal corresponding to each touch electrode is acquired, and then the controller 130 compares the acquired signal amplitude with a threshold value to thereby detect a valid touch signal from among the detection signals. In addition, second touch data that includes touch coordinates of the stylus pen 20 is acquired corresponding to touch electrodes where the valid touch signal is detected (S26).

A resonance signal generated from the stylus pen 20 has a phase that is changed corresponding to a phase of a driving signal applied to the touch sensor 100. Thus, the detection signal of the touch sensor 100 that detects and outputs the resonance signal of the stylus pen 20 may also vary in phase in response to the phase of the driving signal applied to the touch sensor 100.

In FIG. 16, for example, the detection signal generated by applying the driving signal in the positive phase and the detection signal generated by applying the driving signal in the opposite phase are different from each other. Thus, the amplitude of the detection signals received by applying the driving signal of the positive phase (e.g., a difference value ΔI between detection data sampled at s0 and s2) becomes +2, and the amplitude of the detection signals received by applying the driving signal on the reverse phase (e.g., a difference value ΔI between detection data sampled at s4 and s6) becomes −2. When the obtained amplitude values are substituted into Equation 1, the final signal intensity value may be reduced through the offset between the amplitude values. That is, since the amplitude value of the detection signal generated by applying the driving signal in the positive phase is +2 and the amplitude value of the detection signal generated by applying the driving signal on the reverse phase is −2, the final signal amplitude acquired when no code is applied becomes (2+(−2))/2=0.

Accordingly, the controller 130 prevents offsets between the amplitude values by multiplying the amplitude of the detection signal obtained by applying the driving signal in the positive phase by the code 1 and multiplying the amplitude of the detection signal obtained by applying the driving signal on the reverse phase by the code −1. That is, the final signal amplitude of the detection signal becomes (2×1+(−2)×(−1))/2=2 when a code according to a phase of a driving signal is applied.

Meanwhile, noise signals are signals that are not affected by the driving signal, and thus the phase is maintained regardless of the phase change of the driving signal as shown in FIG. 16

Thus, when the signal intensity of the noise signals is obtained by substituting in Equation 1, the offset between the amplitude values multiplied by the code is achieved. For example of noise signal 1, it may be filtered since the final signal amplitude acquired through Equation 1 becomes ((2×1)+(2×(−1)))/2=0. In addition, in case of noise signal 3, it may be filtered since the final signal amplitude acquired through Equation becomes (((−2)×1)+(−2)×(−1))/2=0.

In FIG. 16, it is illustrated that the driving signal of the positive phase and the driving signal of the reverse phase are continuously applied to the touch sensor 100 for convenience of description, but only one of the driving signal of the positive phase and the driving signal of the reverse phase may be applied to the touch sensor in one first sub-section T21. Accordingly, at least one second sub-section T21 may be disposed between a section in which the driving signal in the positive phase and the driving signal in the reverse phase are applied.

While the touch device 10 is driving in the second touch driving mode, the arrangement of the sections in which the first driving signals with different phases are output and the sections in which the second driving signals are output can be variously modified.

Hereinafter, referring to FIG. 17 to FIG. 20, exemplary embodiments in which a first driving signal and a second driving signal, each having a different phase, are output will be described.

FIG. 17 to FIG. 20 are waveform diagrams of examples in which a touch device outputs a first driving signal and a second driving signal, each having a different phase.

Figure 17:
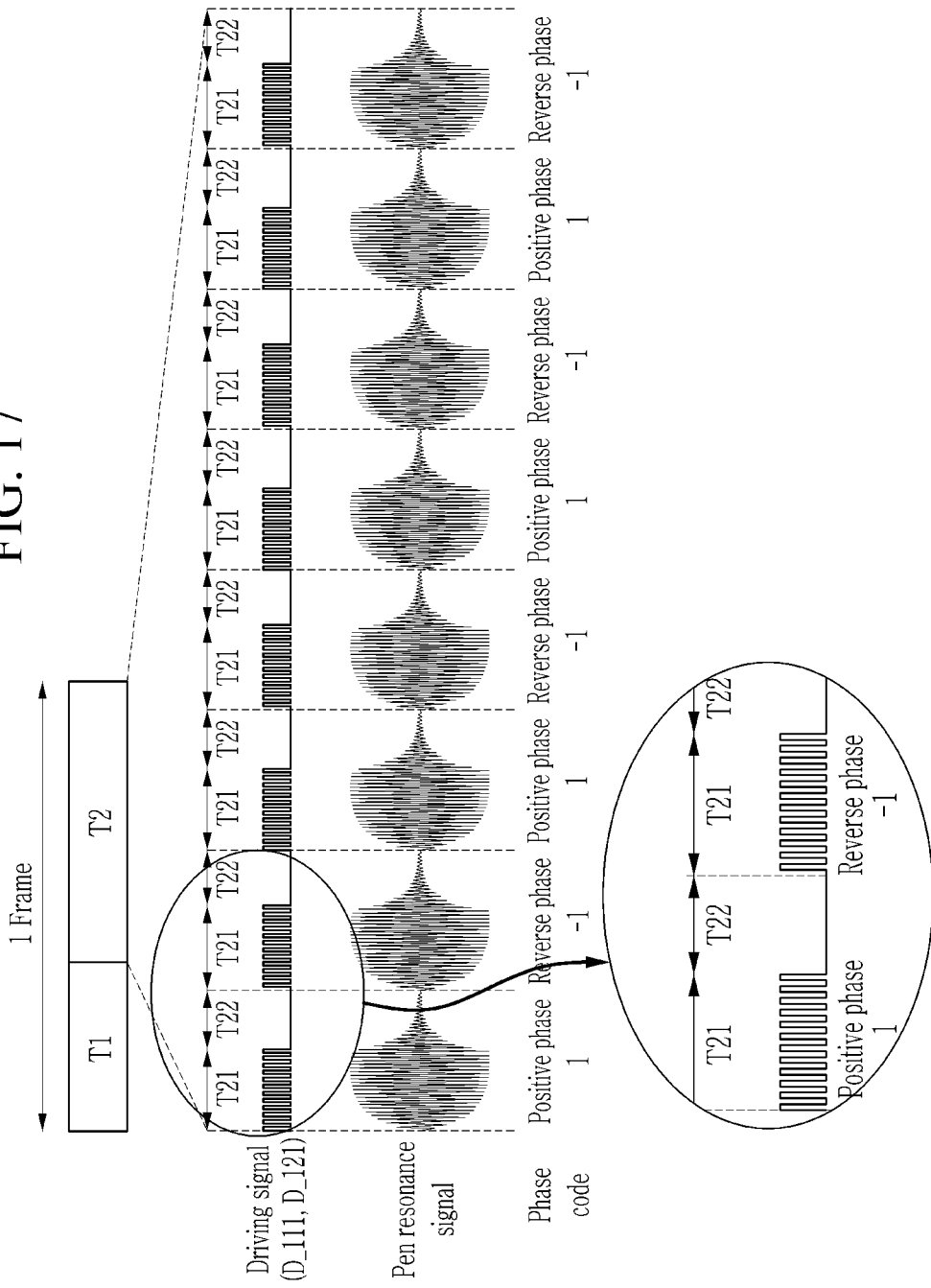
FIG. 17 to FIG. 20 are waveform diagrams of examples in which a touch device outputs a first driving signal and a second driving signal, each having a different phase.
Figure 18:
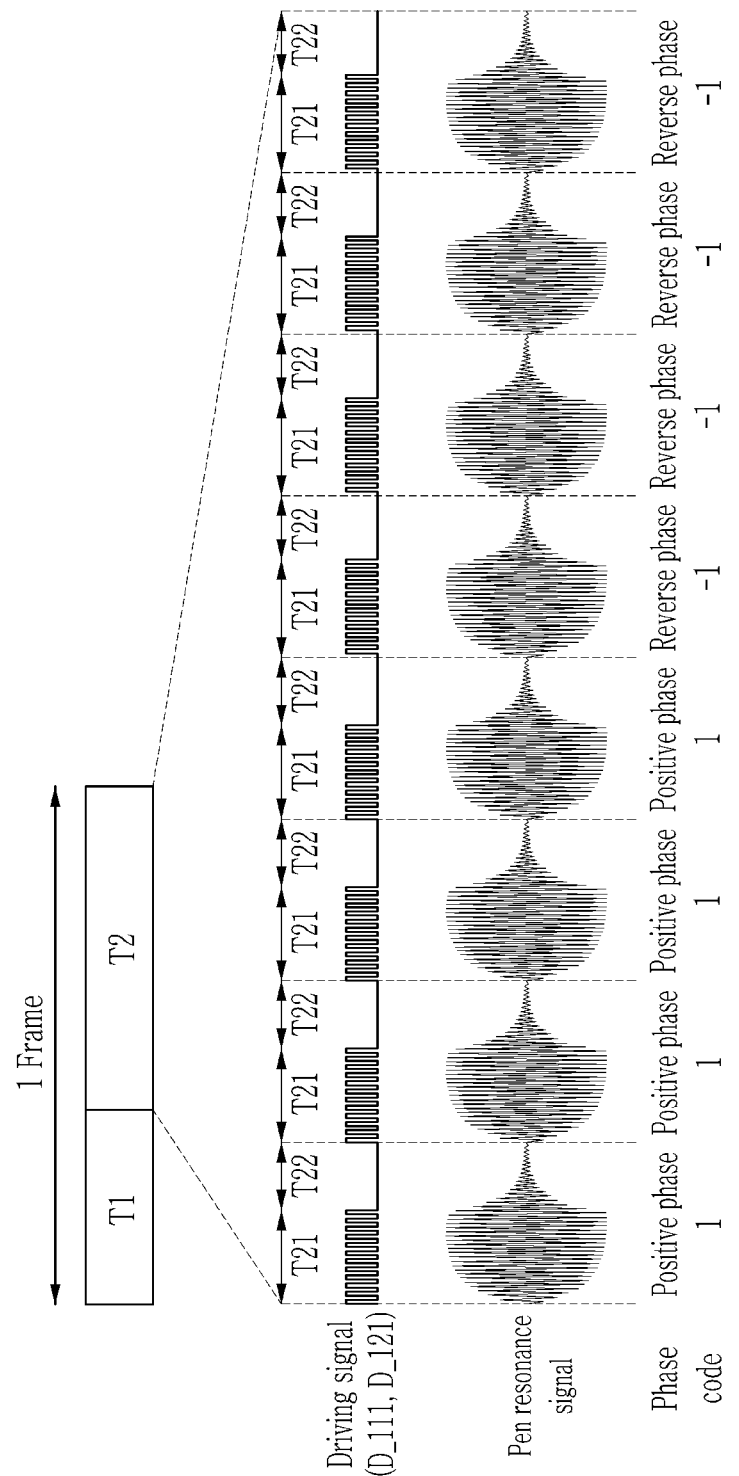
Figure 19:
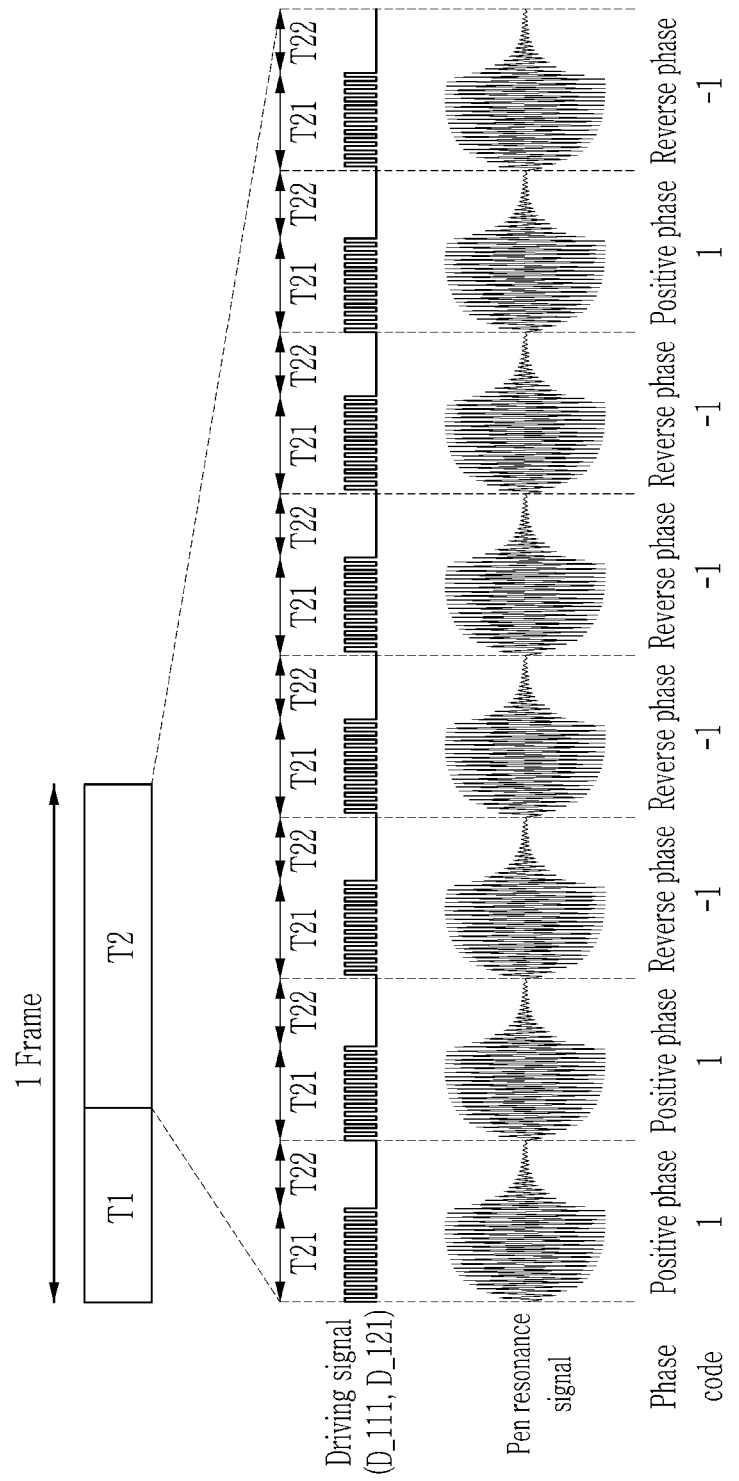

Referring to FIG. 17 to FIG. 19, one frame section is divided into a first section T1 during which a touch device 10 is driven in a first touch driving mode and a second section T2 during which the touch device 10 is driven in a second touch driving mode, and when a second section T2 of the current frame section is terminated, a first section T1 of the next frame section starts.

In one frame section, the second section T2 in which the touch device 10 is driven in the second touch driving mode includes a plurality (e.g., 8) of combinations of the first sub-section T21 during which the driving signal is applied and the second sub-section T22 that follows the first sub-section T21 and to which the driving signal is not applied. In addition, a first sub-section signal T21 during which a first driving signal is applied and a first sub-section T21 during which a second driving signal is applied may be included at least once in one second section T2.

Referring to FIG. 17, first and second driver/receivers 110 and 120 may alternately apply a first driving signal in the positive phase and a second driving signal on the reverse phase according to a predetermined period (e.g., at every first sub-section T21). In this case, the number of sections in which the first driving signal is applied and the number of sections in which the second driving signal among the first sub-sections T21 included in the second section T2 are the same.

Meanwhile, the first sub-section T21 in which the first driving signal is applied within one second section T2 may be continued at least twice. Similarly, the first sub-section T21 in which the second driving signal is applied within one second section T2 may also be continued twice. In FIG. 18, for example, within one second section T2, the first driving signal is continuously applied in the initial four first sub-sections T21 and the second driving signal is continuously applied in the following four first sub-sections T21. In FIG. 18, within one second section T2, the number of times (four times) the first sub-section T21 in which the first driving signal is applied is continuously arranged is the same as the number of times (four times) the first sub-section T21 in which the second driving signal is applied is continuously arranged.

In FIG. 19, the pattern in which the first driving signal in the positive phase and the second driving signal in the reverse phase are applied by the first and second driver/receivers 110 and 120 may be irregular and aperiodic. Referring to FIG. 19, the number of sections in which the first driving signal is applied and the number of sections in which the second driving signal is applied among the first sub-sections T21 included in the second section T2 may be different from each other. In addition, within one second section T2, the number of times the first sub-section T21 in which the first driving signal is applied is continuously arranged may be different from the number of times the first sub-section T21 in which the second driving signal is applied is continuously arranged.

Figure 20:
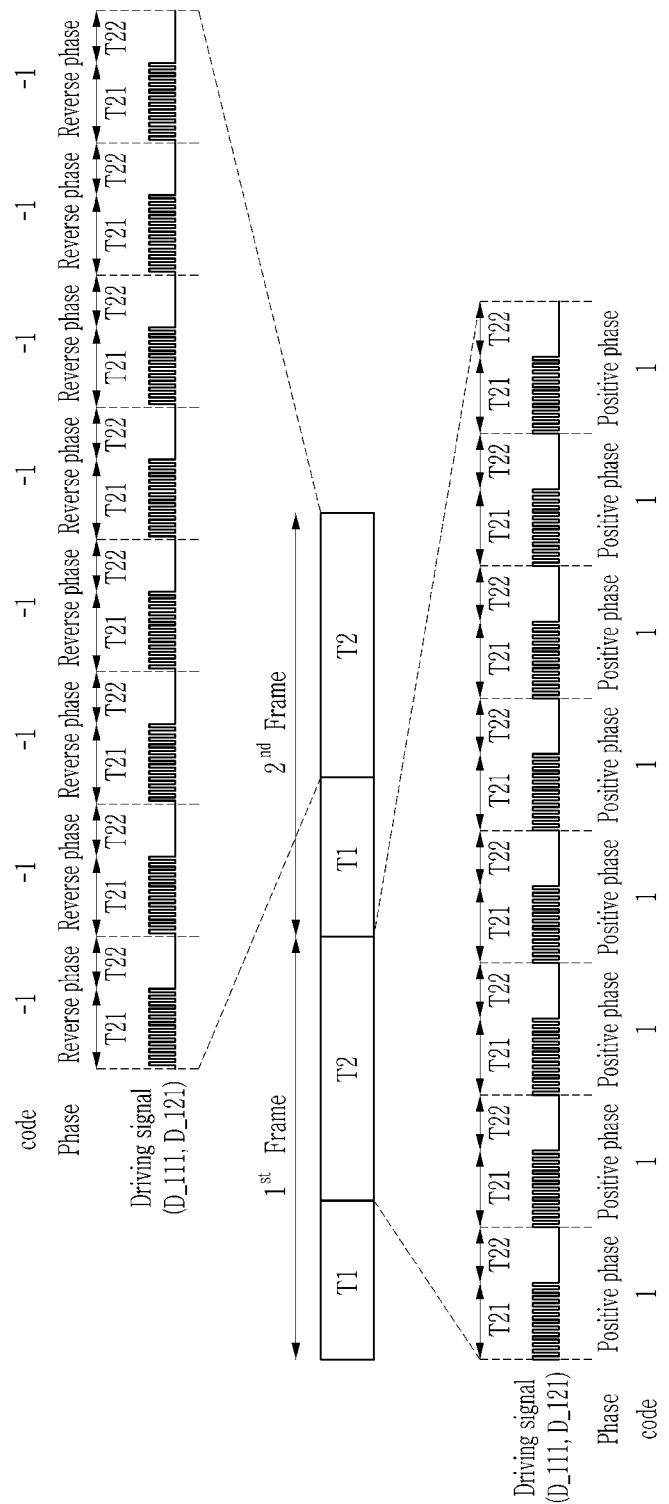

In the above description, the case where the phase change of the driving signal exemplarily occurs in units of the first sub-section T21, but the present invention is not limited thereto. According to another exemplary embodiment, the phase change of the driving signal may occur in units of the second section T2. In FIG. 20, for example, the first driving signal of the positive phase is applied to the touch sensor 100 in the second section T2 of the first frame section, and the second driving signal of the reverse phase is applied to the touch sensor 100 in the second section T2 of the second frame section. In this case, the touch device 10 acquires the final signal amplitude of the detection signal from the detection signals received from the touch sensor 100 in the second section T2 for every frame section based on Equation 1 described above, and may acquire the second touch data using the final signal amplitude. Alternatively, the touch device 10 may acquire the final signal amplitude of the detection signals from the detection signals received from the touch sensor 100 in the second section T2 of the first frame section and the detection signals received from the touch sensor 100 in the second section T2 of the second frame section based on Equation 1 described above, and may acquire the second touch data based on the final signal amplitude.

In the above description, the phase of the first and second driving signals are opposite to each other, that is, the phase difference between the first and second driving signals is 180 degrees, but the present invention is not limited thereto. According to other embodiments, the phase difference between the first and second driving signals may be changed to 90 degrees, 270 degrees, or any other value.

According to the exemplary embodiments described above, the influence of the noise signal on the detection signal can be minimized even in an environment in which noise of a frequency bandwidth similar to the resonance signal of the stylus pen is present, and touch detection performance by the stylus pen can be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A touch device comprising: a plurality of electrodes; and a driver/receiver that applies driving signals, each having a frequency corresponding to a resonance frequency of a stylus pen, to the plurality of electrodes to resonate the stylus pen during a first section, and receives detection signals from the plurality of electrodes during the first section, the first section includes a plurality of first sub-sections during which the driving signals is applied and a plurality of second sub-sections, wherein the driving signals include a first driving signal and a second driving signal having different phase and the same frequency from the first driving signal, the driver/receiver applies the first driving signal to the plurality of electrodes during some of the first sub-section of the plurality of first sub-sections, and applies the second driving signal to the plurality of electrodes during the remaining of the first sub-section of the plurality of first sub-sections, and the driver/receiver receives the detection signals from the plurality of electrodes during the plurality of second sub-sections.

2. The touch device of claim 1, further comprising a controller that acquires touch data based on the detection signals received from the plurality of electrodes during the plurality of second sub-sections.

3. The touch device of claim 2, wherein, among the plurality of first-subsections, a number of first sub-sections during which the first driving signal is applied and a number of first sub-sections during which the second driving signal is applied are the same.

4. The touch device of claim 2, wherein, among the plurality of first-subsections, a number of first sub-sections during which the first driving signal is applied and a number of first sub-sections during which the second driving signal is applied are different from each other.

5. The touch device of claim 2, wherein one of the plurality of first sub-sections during which the first driving signal is applied and another of the plurality of first sub-sections during which the second driving signal is applied are alternately arranged with a predetermined period in the first section.

6. The touch device of claim 2, wherein one of the plurality of first sub-sections during which the first driving signal is applied and another of the plurality of first sub-sections during which the second driving signal is applied repeat at least once in the first section.

7. The touch device of claim 2, wherein each of one of the plurality of first sub-sections during which the first driving signal is applied and another of the plurality of first sub-sections during which the second driving signal is applied is continuously arranged at least two times in the first section.

8. The touch device of claim 2, wherein one of the plurality of first sub-sections during which the first driving signal is applied is continuously arranged in a first number of times, another of the plurality of first sub-sections during which the second driving signal is applied is continuously arranged in a second number of times, and the first number is different from the second number.

9. The touch device of claim 2, wherein one of the plurality of first sub-sections during which the first driving signal is applied is continuously arranged in a first number of times and another of the plurality of first sub-sections during which the second driving signal is applied is continuously arranged in the first number of times.

10. The touch device of claim 2, wherein
the controller calculates a first amplitude value by multiplying a first value by an amplitude value of a first detection signal when the detection signals are first detection signals received from the plurality of electrodes corresponding to the first driving signal, calculates a second amplitude value by multiplying a second value by an amplitude value of a second detection signal when the detection signals are second detection signals received from the plurality of electrodes corresponding to the second driving signal, and acquires the touch data based on the first amplitude value and the second amplitude value, and
the first value and the second value have the same absolute value and different signs.

11. The touch device of claim 3, wherein the touch data corresponds to a capacitance change amount of an electrode of the plurality of electrodes, a change amount of the detection signal, or an analog-to-digital converter output due to a touch of the stylus pen.

12. A touch detection method of a touch device, comprising: selectively applying one of a first driving signal and a second driving signal, each having a frequency corresponding to a resonance frequency of a stylus pen and having different phases, to a plurality of electrodes to resonate the stylus pen; receiving detection signals from the plurality of electrodes; calculating amplitude of each of the detection signals; repeating the applying, the receiving, and the calculating a predetermined number of times during a first section; acquiring a final signal amplitude corresponding to each of the plurality of electrodes by using the amplitude calculated whenever the calculating is performed; and acquiring touch data by touch of the stylus pen based on the final signal amplitude, wherein the first section includes a plurality of first sub-sections and a plurality of second sub-sections, wherein the first driving signal is applied to the plurality of electrodes during some of the first sub-section of the plurality of first sub-sections and the second driving signal having different phase from the first driving signal is applied to the plurality of electrodes during the remaining of the first sub-section of the plurality of first sub-sections, and the detection signals are received from the plurality of electrodes during the plurality of the second sub-sections.

13. The touch detection method of claim 12, wherein the selective applying comprises selectively applying one of the first driving signal and the second driving signal such that the number of times the first driving signal is applied and the number of times the second driving signal is applied are the same within the predetermined number of times.

14. The touch detection method of claim 12, wherein the selective applying comprises selectively applying one of the first driving signal and the second driving signal such that the number of times the first driving signal is applied and the number of times the second driving signal is applied are different from each other within the predetermined number of times.

15. The touch detection method of claim 12, wherein the selective applying comprises selectively applying one of the first driving signal and the second driving signal such that the first driving signal and the second driving signal are alternately applied at a predetermined cycle within the predetermined number of times.

16. The touch detection method of claim 12, wherein the selective applying comprises selectively applying one of the first driving signal and the second driving signal such that application of the first driving signal and application of the second driving signal repeat at least once within the predetermined number of times.

17. The touch detection method of claim 12, wherein the selective applying comprises selectively applying one of the first driving signal and the second driving signal such that each of the first driving signal and the second driving signal is continuously applied at least two times, and the number of times of the first driving signal is continuously applied and the number of times the second driving signal is continuously applied are different from each other within the predetermined number of times.

18. The touch detection method of claim 12, wherein the selective applying comprises selectively applying one of the first driving signal and the second driving signal such that each of the first driving signal and the second driving signal is continuously applied at least two times, and the number of times the first driving signal is continuously applied and the number of times the second driving signal is continuously applied are the same within the predetermined number of times.

19. The touch detection method of claim 12, wherein the acquiring of the final signal amplitude comprises:

calculating a first amplitude value by multiplying a first value by an amplitude value of a first detection signal when the detection signals received from the plurality of electrodes corresponding to the first driving signal are first detection signals;

calculating a second amplitude value by multiplying a second value by an amplitude value of a second detection signal when the detection signals received from the plurality of electrodes corresponding to the second driving signal are second detection signals; and acquiring the final signal amplitude based on the first amplitude value and the second amplitude value acquired during a predetermined time period, wherein the first value and the second value have the same absolute value and different signs.

20. The touch detection method of claim 19, wherein the acquiring of the touch data comprises acquiring the touch data based on an electrode of which corresponding final signal intensity is a threshold value or higher among the plurality of electrodes.

* * * * *